(12) United States Patent
Kwon et al.

(10) Patent No.: US 11,021,830 B2
(45) Date of Patent: Jun. 1, 2021

(54) METHOD FOR CONTROLLING CLOTHES TREATMENT APPARATUS

(71) Applicant: LG Electronics Inc., Seoul (KR)

(72) Inventors: Oshin Kwon, Seoul (KR); Keunjoo Kim, Seoul (KR); Jaeyong Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 186 days.

(21) Appl. No.: 16/310,710

(22) PCT Filed: Jun. 16, 2017

(86) PCT No.: PCT/KR2017/006333
§ 371 (c)(1),
(2) Date: Dec. 17, 2018

(87) PCT Pub. No.: WO2017/217810
PCT Pub. Date: Dec. 21, 2017

(65) Prior Publication Data
US 2019/0177900 A1    Jun. 13, 2019

(30) Foreign Application Priority Data

Jun. 17, 2016 (KR) .................... 10-2016-0075548

(51) Int. Cl.
*D06F 37/30* (2020.01)
*D06F 37/12* (2006.01)
(Continued)

(52) U.S. Cl.
CPC ............ *D06F 37/302* (2013.01); *D06F 29/00* (2013.01); *D06F 33/00* (2013.01); *D06F 37/12* (2013.01);
(Continued)

(58) Field of Classification Search
CPC .......... D06F 29/00; D06F 31/00; D06F 33/00; D06F 37/12; D06F 37/16; D06F 37/24; D06F 37/302; D06F 95/002
See application file for complete search history.

(56) References Cited

U.S. PATENT DOCUMENTS 3,324,688 A * 6/1967 Hubbard ................. D06F 29/02
68/4
3,481,162 A * 12/1969 Ziegler .................... D06F 13/00
68/4
(Continued)

FOREIGN PATENT DOCUMENTS

CN 1470703 1/2004
CN 101191291 6/2008
(Continued)

OTHER PUBLICATIONS

PCT International Search Report and Written Opinion in International Appln. No. PCT/KR2017/006333, dated Sep. 20, 2017, 8 pages.

(Continued)

*Primary Examiner* — Joseph L. Perrin
(74) *Attorney, Agent, or Firm* — Fish & Richardson P.C.

(57) ABSTRACT

Disclosed is a method for controlling a laundry treating apparatus that includes: a tub; a main drum rotatably disposed within the tub; a driver configured to drive the main drum; and an auxiliary drum disposed in the main drum configured to be attached to or be detached from the main drum. The method comprises a positioning operation for allowing a predetermined portion of the auxiliary drum to be positioned at a target position via a rotation of the auxiliary
(Continued)

drum, wherein the positioning operation is configured such that when the predetermined portion reaches a braking-initiation position set such that the predetermined portion is positioned at the target position, a braking of the auxiliary drum is initiated, wherein the braking-initiation position is set to vary based on a magnitude of a load applied to the driver.

22 Claims, 17 Drawing Sheets

(51) Int. Cl.
| | |
|---|---|
| *D06F 37/24* | (2006.01) |
| *D06F 39/08* | (2006.01) |
| *D06F 33/00* | (2020.01) |
| *D06F 29/00* | (2006.01) |
| *D06F 37/42* | (2006.01) |
| *D06F 37/16* | (2006.01) |
| *H02P 1/00* | (2006.01) |
| *D06F 31/00* | (2006.01) |
| *H02K 11/215* | (2016.01) |
| *H02K 1/27* | (2006.01) |
| *H02K 7/14* | (2006.01) |

(52) U.S. Cl.
CPC .............. *D06F 37/16* (2013.01); *D06F 37/24* (2013.01); *D06F 37/42* (2013.01); *D06F 39/08* (2013.01); *D06F 39/088* (2013.01); *D06F 31/00* (2013.01); *D06F 37/304* (2013.01); *D06F 2202/12* (2013.01); *D06F 2204/065* (2013.01); *H02K 1/2786* (2013.01); *H02K 7/14* (2013.01); *H02K 11/215* (2016.01); *H02P 1/00* (2013.01)

(56) References Cited

U.S. PATENT DOCUMENTS

| | | | | |
|---|---|---|---|---|
| 3,509,741 | A | * | 5/1970 | Morey .................... D06F 37/12 68/27 |
| 3,575,020 | A | * | 4/1971 | Hubbard ................ D06F 13/00 68/4 |
| 4,175,409 | A | * | 11/1979 | Morey .................... D06F 33/00 68/4 |
| 4,637,230 | A | * | 1/1987 | Roberts .................. D06F 29/00 68/18 FA |
| 4,637,231 | A | * | 1/1987 | McMillan ............... D06F 33/00 68/4 |
| 2015/0059417 | A1 | * | 3/2015 | Ramasco ............... D06F 39/022 68/17 A |
| 2015/0184326 | A1 | * | 7/2015 | Seo ......................... D06F 37/20 68/132 |
| 2015/0211163 | A1 | * | 7/2015 | Kim ........................ D06F 17/10 68/133 |
| 2016/0201243 | A1 | * | 7/2016 | Bergamo ................ D06F 37/12 8/137 |
| 2016/0222567 | A1 | * | 8/2016 | Ramasco ............... D06F 95/002 |

FOREIGN PATENT DOCUMENTS

| | | |
|---|---|---|
| CN | 101307553 | 11/2008 |
| CN | 102884239 | 1/2013 |
| JP | 05111591 | 5/1993 |
| KR | 100220753 | 9/1999 |
| KR | 1020000045027 | 7/2000 |
| KR | 1019950002007 | 3/2015 |
| KR | 1020150030806 | 3/2015 |

OTHER PUBLICATIONS

Chinese Office Action in Chinese Application No. 201780049882.2, dated Aug. 4, 2020, 10 pages (with English translation).

* cited by examiner

METHOD FOR CONTROLLING CLOTHES TREATMENT APPARATUS

TECHNICAL FIELD

The present disclosure relates to a method for controlling a laundry treating apparatus, and more particularly, to a method for controlling an auxiliary drum which is detachably installed inside a main drum and rotates integrally with the main drum to perform a washing cycle.

BACKGROUND ART

Generally, the laundry treating apparatus includes a washing machine for performing washing, a dryer for performing drying, and a drying and washing machine for drying and washing together.

When the laundry treating apparatus is used as a washing apparatus, the laundry treating apparatus includes a cabinet which forms the appearance, a tub disposed inside the cabinet for receiving washing-water, a drum, which is rotatably installed in the tub and receives laundry, and a door coupled to the cabinet that allows the laundry to be injected and taken out.

The laundry treating apparatus may be divided into a top loading type in which the rotational axis of the drum is perpendicular to the ground and a front loading type in which the rotational axis of the drum is arranged to be parallel with respect to the ground.

In the front loading type, the rotational axis of the drum is formed substantially perpendicular to the ground. When the detergent, washing-water and laundry are injected into in the drum, the drum is rotated via receiving the driving force of the drive mechanism, and then the friction between the drum and the laundry and the falling impact of the laundry may allow washing to be performed in a drum washing manner. In this drum washing method, there occurs almost no damage to the laundry, and the laundry does not tangle, and the machine also taps and scrubs the laundry.

In the top loading type, the rotational axis of the drum is formed substantially perpendicular to the ground. The drum is provided inside the tub where washing-water is stored. Washing is performed while the laundry is stored in the washing-water-supplied in the drum. The top loading type may be classified into a pulsator manner and an agitator manner. In the pulsator manner, the laundry may be washed by rotating a washing water and a laundry using a pulsator rotatably provided on the bottom of a drum to receive the laundry and washing water from the inside of the washing machine. In the agitator manner, the washing water and the laundry to be washed are rotated by an agitator protruding upward from the bottom of the drum.

In the top loading type, rotation of the drum or rotation of the agitator or pulsator provided at the bottom of the drum to form a water stream may allow the washing to be performed via the friction between the washing water and the laundry and the reaction of the detergent. Thus, washing-water must be supplied to a degree such that the laundry is submerged in the washing-water. Much washing-water may be consumed.

In the conventional laundry treating apparatus, the laundry washing process, i.e., the washing cycle, the rinsing cycle and the dewatering cycle, is performed in one drum. Accordingly, when the laundry is separated and washed according to the color or material of the laundry, at least two washing processes should be performed. Thus, the laundry treating apparatus operates more frequently, which causes washing-water, detergent and energy to be wasted.

Recently, there has been provided a washing machine provided with two drums in one body. That is, a large capacity drum and a small capacity drum are provided. The user may use one selected drum or both at the same time as needed. A washing process via the large capacity drum and a washing process via the small capacity drum are completely separated from each other, so that the use of the drums is convenient. In one example, in the case of a small amount of laundry, only the small capacity drum may be used, which is very economical.

However, such a washing machine is inevitably accompanied by an increase in product prices. Since the two drums are provided separately from each other, the size of the machine itself is inevitably increased. Therefore, there is a problem that a wider installation space is required than a space in which a conventional washing machine is installed.

Furthermore, when a small drum is located under a large drum, there is a problem that the user has to bend downwardly excessively when using the small drum. Furthermore, when the small drum is placed above the large drum, there is a problem that it is difficult for the user with a small height to access the small drum.

In one example, according to the prior art, a laundry treating apparatus having an auxiliary drum detachably installed in the drum has been proposed in order to perform individual washing in one washing machine. However, the auxiliary drum in the prior art has a small capacity. It is difficult to install a separate device for generating a vortex into the auxiliary drum. Since the frequency of the vortex occurrences due to rotation of the auxiliary drum is relatively low compared to that by the main drum. Thus, there is a problem that the washing power by the auxiliary drum is not sufficient.

Since a coupling portion between the auxiliary drum and the main drum is located at a relatively narrow space, there is a problem in that it is not easy for the user to mount the auxiliary drum at a correct position.

Furthermore, the auxiliary drum vibrates not only in the horizontal direction but also in the vertical direction at the time of high-speed rotation in order to perform the dewatering or spinning cycle, etc. Thus, there is a problem that the auxiliary drum may separate from the main drum.

In one example, in order that one water-supply is used to supply water to the main drum and auxiliary drum, respectively or in order to rotate the auxiliary drum by a certain rotation angle so that the user can easily attach or detach the auxiliary drum to or from the main drum, it is necessary to control the position of the auxiliary drum. However, due to the weight of laundry or washing-water contained in the auxiliary drum or main drum, a slipping angle at stopping may vary. Thus, it may be difficult to control the auxiliary drum to a desired position.

Further, to avoid the position control of the auxiliary drum, a water-supply device for supplying water to the main drum and a water-supply device for supplying water to the auxiliary drum are separately required. As a result, there is a problem that the volume of the laundry treating apparatus is increased and the manufacturing cost is increased.

Furthermore, the water is discharged to the inside of the main drum during the spinning process including a simple spinning in the washing process, that is, among the washing cycle, the rinse cycle and the spinning cycle by the auxiliary drum. That is, in the prior art, the washing processes in the main drum and the auxiliary drum are not substantially separated from each other. Specifically, in the prior art, both the supply to the auxiliary drum and the supply to the main drum are performed via the auxiliary drum. Therefore, the detergent supplied to the auxiliary drum is not left in the auxiliary drum by a sufficient amount. Rather, the detergent is then supplied to the main drum. As a result, there is a problem that the washing effect in the auxiliary drum is deteriorated. That is, the detergent supplied to the auxiliary drum is supplied to the main drum. As a result, the washing effect in the auxiliary drum may be deteriorated.

Furthermore, excessive detergent may be supplied to the main drum. Therefore, it is not easy to use proper amounts of detergent in the auxiliary drum and main drum.

Depending on the type of the laundry, the type of detergent may vary. That is, the detergent supplied to the main drum and the detergent supplied to the auxiliary drum may be different from each other. However, in the prior art, the use of these different types of the detergents will not be acceptable.

When a small amount of highly contaminated mop is washed off in the auxiliary drum and large-capacity baby clothes are washed in the main drum, the washing water first wets the contaminated mop and then flows into the main drum. Likewise, the washing water discharged from the auxiliary drum first flows into the main drum and then is discharged out.

Therefore, such a use manner may be not suitable for washing the laundry which requires a high degree of cleanliness in the main drum. Further, such a use manner will not be emotionally acceptable to the user.

This problem may be caused by the fact that water-supply, washing and drainage are not substantially separated between the auxiliary drum and the main drum.

In addition, in the prior art, it is not possible to additionally inject a sock-like laundry to the main drum. This is because the auxiliary drum is blocking the laundry inlet to the main drum.

DISCLOSURE

Technical Purpose

The present disclosure basically aims at solving the above-mentioned prior art problems.

According to one embodiment of the present disclosure, there is provided a laundry treating apparatus in which an auxiliary drum is easily installed in a main drum and washing by the main drum and washing by the auxiliary drum may be separated from each other.

According to one embodiment of the present disclosure, there is provided a laundry treating apparatus in which a single water-supply implements both of a water-supply to the auxiliary drum and a water-supply to the main drum.

According to one embodiment of the present disclosure, there is provided a laundry treating apparatus in which the water-supply to the auxiliary drum and the water-supply to the main drum may realized by a single water-supply and may be substantially individually performed.

According to one embodiment of the present disclosure, there is provided a laundry treating apparatus in which the wash-water discharged from the auxiliary drum does not enter the main drum.

According to one embodiment of the present disclosure, there is provided a laundry treating apparatus in which an position of an certain portion of the auxiliary drum coincides with a specific rotational position such that it is easy for the user to easily attach the auxiliary drum to the main drum or to easily separate the auxiliary drum from the main drum.

In accordance with one embodiment of the present disclosure, a laundry treating apparatus, which may obtain sufficient washing effect via the auxiliary drum is to be provided.

In accordance with one embodiment of the present disclosure, a laundry treating apparatus is to be provided in which an additional laundry is input to the main drum as well as the auxiliary drum.

In accordance with one embodiment of the present disclosure, there is to be provided a laundry treating apparatus, in which washing-water in the auxiliary drum is not discharged in the washing process whereas, only in the spinning process, the wash-water is discharged from the auxiliary drum. In particular, there is a need for a laundry treating apparatus which may implement drainage while separate driving means such as a drainage pump is not connected to the auxiliary drum.

Technical Solutions

In a first aspect of the present disclosure, there is provided a method for controlling a laundry treating apparatus, wherein the apparatus includes: a tub for receiving washing-water therein; a main drum rotatably disposed within the tub; a drive mechanism configured for driving the main drum; and an auxiliary drum disposed in the main drum so as to be attachable or detachable to or from an inner circumferential face of the main drum, wherein a rotation of the auxiliary drum is dependent on a rotation of the main drum, wherein washing of a laundry by the auxiliary drum is performed separately from washing of a laundry by the main drum, wherein the method comprises a positioning operation for allowing a predetermined portion of the auxiliary drum to be positioned at a target position via a rotation of the auxiliary drum, wherein the positioning operation is configured such that when the predetermined portion reaches a braking-initiation position set such that the predetermined portion is positioned at the target position, a braking of the auxiliary drum is initiated, wherein the braking-initiation position is set to vary based on a magnitude of a load applied to the drive mechanism.

The positioning operation includes: a rotation operation in which the auxiliary drum is accelerated to a preset rotation speed; braking operation in which when the predetermined portion reaches a preset first braking-initiation position after a completion of the rotation operation, a braking of the auxiliary drum is initiated; and a correction operation in which when the auxiliary drum stops via the braking, the first braking-initiation position is corrected based on a rotation angle difference between the target position and a stop position at which the predetermined portion stops, thereby to generate a second braking-initiation position.

The rotation operation includes: a first rotation operation in which the auxiliary drum is accelerated to the preset rotation speed; and a second rotation operation in which the auxiliary drum rotates further by a first target angle after a completion of the first rotation operation.

The first target angle is defined as an angle by which the auxiliary drum rotates for a duration from a completion time of the first rotation operation to a time when the predetermined portion reaches the first braking-initiation position.

The apparatus further includes a first sensor unit for sensing a rotation of the auxiliary drum, wherein the completion time of the first rotation operation coincides with a time when the first sensor unit has performed at least two times sensings such that the auxiliary drum rotates at least once.

The first sensor unit includes: a first magnet disposed on the auxiliary drum; and a first Hall sensor disposed on the tub to sense the first magnet.

The second rotation operation is configured such that the auxiliary drum rotates at a rotation speed achieved at the completion time of the first rotation operation.

The apparatus further includes a second sensor unit for sensing a rotation angle of the auxiliary drum, wherein the second rotation operation is configured such that the auxiliary drum rotates until the second sensor unit senses the first target angle.

The drive mechanism includes: a rotation shaft connected to the drum; and a motor, wherein the motor includes: a stator fixed to a bottom face of the tub, wherein the rotation shaft passes through the stator; and a rotor fixed to the rotation shaft and rotating about the stator, wherein the second sensor unit includes: a plurality of second magnets arranged along and on an outer periphery of the rotor and spaced apart from each other at a predetermined angular spacing; and a single second Hall sensor disposed on the tub to sense the plurality of second magnets.

The preset rotation speed may be about 20 rpm.

The positioning operation further includes: a further rotation operation in which the auxiliary drum is accelerated to the preset rotation speed after completion of the correction operation; and a further braking operation in which when the predetermined portion reaches the second braking-initiation position after completion of the further rotation operation, a braking of the auxiliary drum is initiated.

The further rotation operation includes: a first further rotation operation in which the auxiliary drum is accelerated to the preset rotation speed; and a second further rotation operation in which the auxiliary drum further rotates by a second target angle after completion of the first further rotation operation.

The second target angle is defined as an angle by which the auxiliary drum rotates for a duration from the completion time of the first further rotation operation to a time when the predetermined portion reaches the second braking-initiation position.

The apparatus further includes a first sensor unit for sensing a rotation of the auxiliary drum, wherein the completion time of the first further rotation operation coincides with a time when the first sensor unit has achieved at least two times sensings such that the auxiliary drum rotates at least once.

The further rotation operation is configured such that the auxiliary drum is accelerated to about 20 rpm.

The apparatus further includes: a single water-supply for supplying washing-water; an outer water-supply guide disposed on the auxiliary drum to guide washing water discharged from the water-supply to the main drum; and an inner water-supply guide spaced apart from the outer water-supply guide, wherein the inner water-supply guide is disposed on the auxiliary drum to guide the wash-water discharged from the water-supply to the auxiliary drum, wherein the predetermined portion includes the outer water-supply guide or the inner water-supply guide, wherein the target position includes: a main target position at which the outer water-supply guide is positioned below the water-supply; or an auxiliary target position at which the inner water-supply guide is positioned below the water-supply via rotation of the auxiliary drum.

The method further comprises, after the positioning operation, a water-supply initiation operation in which the water-supply is opened to supply the washing-water.

the water-supply initiation operation includes: a main water-supply initiation operation in which washing water is supplied from the water supply to the tub at the main target position; and an auxiliary water-supply initiation operation in which washing-water is supplied from the water-supply to the auxiliary drum in the auxiliary target position.

The method further comprises an auxiliary-drum mounting detection operation for detecting whether the auxiliary drum is mounted in the main drum.

When it is determined in the auxiliary-drum mounting detection operation that the auxiliary drum is mounted in the main drum, the positioning operation is initiated.

In a second aspect of the present disclosure, there is provided a method for controlling a laundry treating apparatus, wherein the apparatus includes: a tub for receiving washing-water therein; a main drum rotatably disposed within the tub; a drive mechanism configured for driving the main drum; an auxiliary drum disposed in the main drum so as to be attachable or detachable to or from an inner circumferential face of the main drum, wherein a rotation of the auxiliary drum is dependent on a rotation of the main drum, wherein washing of a laundry by the auxiliary drum is performed separately from washing of a laundry by the main drum; a single water-supply for supplying washing-water; an outer water-supply guide disposed on the auxiliary drum to guide washing water discharged from the water-supply to the main drum; and an inner water-supply guide spaced apart from the outer water-supply guide, wherein the inner water-supply guide is disposed on the auxiliary drum to guide the wash-water discharged from the water-supply to the auxiliary drum, wherein the method comprises a positioning operation for allowing the outer water-supply guide or the inner water-supply guide to be positioned at a target position via a rotation of the auxiliary drum, wherein the positioning operation includes: a rotation operation in which the auxiliary drum is accelerated to a preset rotation speed; and a braking operation in which a braking of the auxiliary drum is initiated when the outer water-supply guide or the inner water-supply guide reaches a preset target position after completion of the rotation operation.

The preset rotation speed is set such that the auxiliary drum slips within a predetermined range.

When the preset rotation speed is set to a range of 0 rpm exclusive and 5 rpm inclusive.

Technical Effects

The washing machine according to the embodiments of the present disclosure has the following effects.

First, according to one embodiment of the present disclosure, a vortex is sufficiently generated inside the auxiliary drum via rotation of the auxiliary drum without a separate vortex generator, thereby improving the washing power.

Second, according to one embodiment of the present disclosure, convex-concave portions including concave and convex portions are formed in a considerably wide area. Thus, the user may more easily mount the auxiliary drum on the main drum at the correct position.

Third, according to one embodiment of the present disclosure, the auxiliary drum may not be separated from the main drum during a high-speed rotation of the auxiliary drum.

Fourth, according to one embodiment of the present disclosure, the wash water may be supplied to the main drum and auxiliary drum, respectively, from a single water-supply.

This may not only reduce the volume of the laundry treating apparatus, but may also have the effect of reducing manufacturing costs.

Fifth, according to one embodiment of the present disclosure, the washing waters supplied to the main drum and auxiliary drum may not mix with each other via a single water-supply device.

Sixth, according to one embodiment of the present disclosure, an position of an certain portion of the auxiliary drum coincides with a specific rotational position such that it is easy for the user to easily attach the auxiliary drum to the main drum or to easily separate the auxiliary drum from the main drum.

Seventh, according to one embodiment of the present disclosure, in a spinning operation by a high speed rotation of the auxiliary drum, wash-water is discharged to the outside of the main drum and, thus, laundry inside the main drum is prevented from being contaminated. As a result, washing by the main drum and washing by the auxiliary drum may proceed independently.

BEST MODE FOR CARRYING OUT THE INVENTION

Hereinafter, a drum washing machine and a method for cleaning a tub 20 of the drum washing machine according to various embodiments of the present disclosure will be described in detail with reference to the drawings. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure. For simplicity and clarity of illustration, elements in the figures are not necessarily drawn to scale. The same reference numbers in different figures denote the same or similar elements, and as such perform similar functionality.

Terms "first" and "second" used herein may be used to describe various components, but the components should not be limited by the terms. The terms are used only for the purpose of distinguishing one component from another component.

Moreover, terms used herein are used only to describe a specific embodiment and are not intended to limit a protection scope of the present disclosure. The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Figure 1:
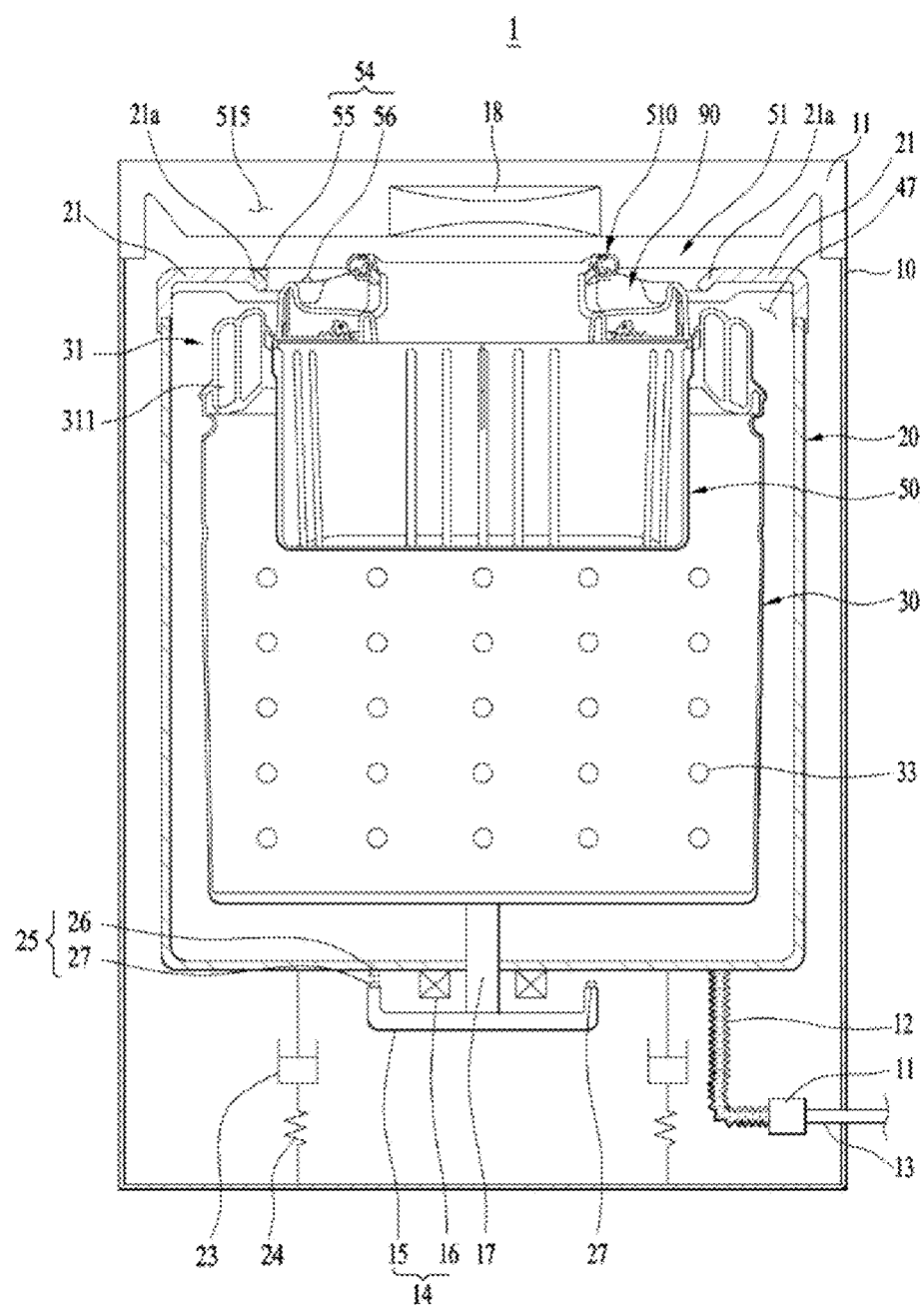
FIG. 1 is a schematic cross-sectional view of a laundry treating apparatus according to one embodiment of the present disclosure.

FIG. 1 is a schematic cross-sectional view of a laundry treating apparatus 1 according to one embodiment of the present disclosure.

Referring to FIG. 1, the laundry treating apparatus 1 according to one embodiment of the present disclosure includes a cabinet 10 with a top opening so that laundry can be injected into the cabinet, a door (not shown) for opening or closing the top opening of the cabinet 10, a tub 20 installed inside the cabinet 10 for storing wash-water therein, a drive mechanism 14 installed on the tub 20 for generating a driving force, a main drum 30 for washing the laundry using the driving force transmitted from the drive mechanism 14, and an auxiliary drum 50 detachably installed in the main drum 30, wherein washing by the main drum 30 is independent from washing by the auxiliary drum 30.

As used herein, washing water for washing and cleaning water for cleaning the door are all called the washing-water. The main drum 30 may be called the main drum, and the auxiliary drum 50 may be called the auxiliary drum.

In FIG. 1, a direct drive structure is shown in which the drive mechanism 14 is directly connected to a rotation shaft 17 and drives the main drum 30. However, the laundry treating apparatus 1 according to one embodiment of the present disclosure is not necessarily limited thereto.

The cabinet 10 forms the appearance of the laundry treating apparatus 1. The cabinet includes a cabinet cover 11 having an opening defined therein for communicating the inside and the outside of the cabinet 10 for the injection of laundry into the cabinet.

A cabinet cover 11 is provided at a top of the cabinet 10. A door (not shown) is rotatably provided at the cover so as to selectively open and close the opening. Accordingly, the user may open and close the door to put laundry in the main drum 30 and the auxiliary drum 50 or remove laundry from the insides of the main drum 30 and the auxiliary drum 50.

In one example, a water-supply 18 is formed in the cabinet cover 11 to supply water containing detergent or clean water free of detergent to the main drum 30 and the auxiliary drum 50. The washing-water discharged from the water-supply 18 is selectively supplied to the main drum 30 or to the auxiliary drum 50 through the inside of the tub 20, depending on the rotation of the auxiliary drum 50 to be described later.

The tub 20 has a cylindrical shape having an open top, and is formed to receive the washing water while being housed in the cabinet 10. The tub 20 includes the tub cover 21, which is mounted at the top thereof.

In the tub cover 21, a laundry inlet 580 is formed in a position corresponding to the opening of the cabinet 10 so that the main drum 30 and the auxiliary drum 50 communicate with the outside.

In one example, the tub cover 21 includes a cover bent portion 21a formed on the inner circumferential surface of the laundry inlet 580 and formed to be inclined downward toward the inside of the tub cover 21.

The cover bent portion 21a guides the washing water which has circulated upwardly along the inner circumferential surface of the tub 20 due to the rotational force of the main drum 30 to enter and fall into the main drum 30. At this time, it is preferable that the auxiliary drum 50 is not mounted in the main drum 30.

The tub 20 is elastically supported at a bottom face thereof by a spring 24 and a damper 23 installed in the cabinet 10. Furthermore, since the tub 20 is directly supported at the bottom face thereof by the spring 24 and the damper 23, the tub itself cannot rotate. Therefore, unlike the main drum 30, the tub 20 does not receive a separate rotational force from the drive mechanism 14. In FIG. 1, a configuration is illustrated in which the spring 24 and the damper 23 are connected in series to the bottom face of the tub 20, but the present disclosure is not limited thereto. The spring 24 and the damper 23 may be connected to the tub in a parallel manner, if necessary. Alternatively, the damper 23 may be connected to the bottom face of tub 20 and the spring 24 may be connected to the top face of tub 20. A opposite configuration is also possible.

Furthermore, a water-discharge system is connected to the bottom face of tub 20 to drain the water. The water-discharge system includes a drain pump 11 that provides power to discharge washing-water received in the tub 20; a first discharge pipe 12 having one end connected to a bottom of the tub, and the other end connected to the drain pump 11, wherein the first discharge pipe 12 guides the washing water received in the tub 20 to the drain pump 11; and a second discharge pipe 13 having one end connected to the drain pump 11 and the other end connected to the cabinet, wherein the second discharge pipe 13 discharges washing-water from the drain pump 11 to the outside of the cabinet 10. The first discharge pipe 12 may be embodied as a bellows tube so that the vibration of the tub 20 is not transmitted to the drain pump 11.

The drive mechanism 14 includes a motor 15 comprised of a rotor 15 and a stator 16, and the rotation shaft 17 connected to the rotor 15.

The laundry treatment apparatus 1 according to one embodiment of the present disclosure includes a main drum 30 configured to be rotatably disposed inside the tub 20 and constructed to be loaded with laundry, and an auxiliary drum 50 detachably mounted in the main drum 30.

The main drum 30 is formed into a cylindrical shape having an open top and a generally circular cross-section. The bottom face of the main drum is directly connected to the rotation shaft 17 connected to the drive mechanism 14 composed of the rotor 15 and the stator 16. As a result, the main drum 30 receives a rotational force from the drive mechanism 14.

A top portion of the main drum 30 is formed into an open cylindrical shape. A plurality of through-holes 33 are formed in the sidewall of the main drum, that is, the circumferential surface portion. The main drum 30 communicates with the tub 20 through the plurality of through-holes 33. Accordingly, when the washing water is supplied to the tub 20 at a certain level or higher in the tub, the main drum 30 is submerged in the washing water, and, then, a portion of the washing water is injected into the main drum 30 through the holes 33.

The main drum 30 includes a main drum-cover 31 provided on its top. The main drum-cover 31 is formed in a shape of a ring having a hollow portion and is disposed below the tub cover 21. In one embodiment, a water discharge channel 47 may be defined between a top face of the drum-cover 31 and a bottom face of the tub cover 21 and may extend in the horizontal direction. The water discharge channel 47 guides the washing-water discharged to the outside through a side face of a top of the auxiliary drum 50 to the inside of the tub 20.

In the main drum-cover 31, an opening is formed through which the laundry is inserted. The auxiliary drum 50 may be mounted through the opening. Further, inside the main drum-cover 31, there is provided a balancer 311 which eliminates the imbalance caused by the laundry biasing in the main drum 30.

Furthermore, the main drum cover 31 includes a first convex-concave portion 315 formed on the inner circumferential surface thereof so that the auxiliary drum 50 is detachable from or attachable to the main drum 30. In addition, the main drum cover 31 includes a stopper 312 protruding from an inner circumferential surface of the main drum cover 31 so as to interfere with fixing means 93 of the auxiliary drum 50 seated on the first convex-concave portion 315 to prevent upward movement of the main drum 30. The first convex-concave portion 315 and the stopper 312 will be described in detail later.

In one example, the laundry treatment apparatus according to one embodiment of the present disclosure additionally includes components that perform a method for controlling the water-supply to be described below. These components may include a first sensor unit 54, a second sensor unit 25, a controller 100 (see FIG. 13), and a braking mechanism 110 (see FIG. 13).

The first sensor unit 54 may include a first Hall sensor 55 and a first magnet 56 for sensing a rotation count of the auxiliary drum 50. The first Hall sensor 55 may be disposed on the top face of the cover of the tub 20 or on the inner edge face of the cover of the tub 20. The first magnet 56 may be mounted on the top face of the auxiliary drum 50 so as to be sensed by the first Hall sensor 55. Accordingly, when the auxiliary drum 50 rotates, the first Hall sensor 54 senses the first magnet 56 and then sends a detection signal to the controller 100. In the present embodiment, for convenience of illustration, the first sensor unit 54 composed of a single Hall sensor and a single magnet is shown. However, the present disclosure is not limited thereto. The first sensor unit 54 may be composed of a plurality of Hall sensors and a plurality of magnets.

The second sensor unit 25 may include a single second Hall sensor 26 and a plurality of second magnets 27 for sensing the rotation angle of the main drum 30. The second Hall sensor 26 is disposed on the bottom face of the tub 20 and faces the rotor 15. The plurality of second magnets 27 are arranged along the outer edge of the top face of the rotor 15 to be sensed by the second Hall sensor 26. Therefore, when the main drum 30 rotates, the second Hall sensor 26 senses the rotation angle of the main drum 30 and sends the detection signal to the controller 100. In order for the second sensor unit 25 to sense the correct rotation angle of the main drum 30, the second magnets 27 are arranged on the rotor 15 at regular intervals. As the number of magnets arranged increases, the rotation angle of main drum 30 may be precisely detected. That is, the second sensor unit 25 senses the rotation angle of the rotor 15, thereby determining the rotation angle of the main drum 30.

In one example, the rotation angle of the rotor 15 may be sensed without a separate sensor. That is, the rotation angle of the rotor 15 is sensed in a sensorless manner without a sensor. Thus, the rotation angle of the main drum 30 may be determined in a sensorless manner. In this sensorless manner, a phase current having a constant frequency flows through the motor. The rotor position of the motor is estimated based on an output current detected while the phase current of the constant frequency flows through the motor. In this way, the position of the rotor 15 may be estimated. Since this sensorless manner is well known in the art, a detailed description thereof will be omitted.

The controller 100 controls overall operations (e.g. washing cycle, rinse cycle, spinning cycle, etc.) of the laundry treatment apparatus and operates the laundry treatment apparatus according to the user's setting.

In particular, with regard to the method for controlling the water-supply for the laundry treatment apparatus according to one embodiment of the present disclosure, the controller 100 may receive the signals generated by the first sensor unit 54 and the second sensor unit 25, and, then, the controller 100 may control, based on the received signals, the drive mechanism 14 for rotating the main drum 30, the water-supply 18 for supplying the washing-water, and the braking mechanism for braking the rotating main drum 30 110, and so on.

The braking mechanism 110 stops the main drum 30 by applying a braking force to the rotating main drum 30.

Hereinafter, the auxiliary drum 50 will be described in detail with reference to FIGS. 2 to 4.

Figure 2:
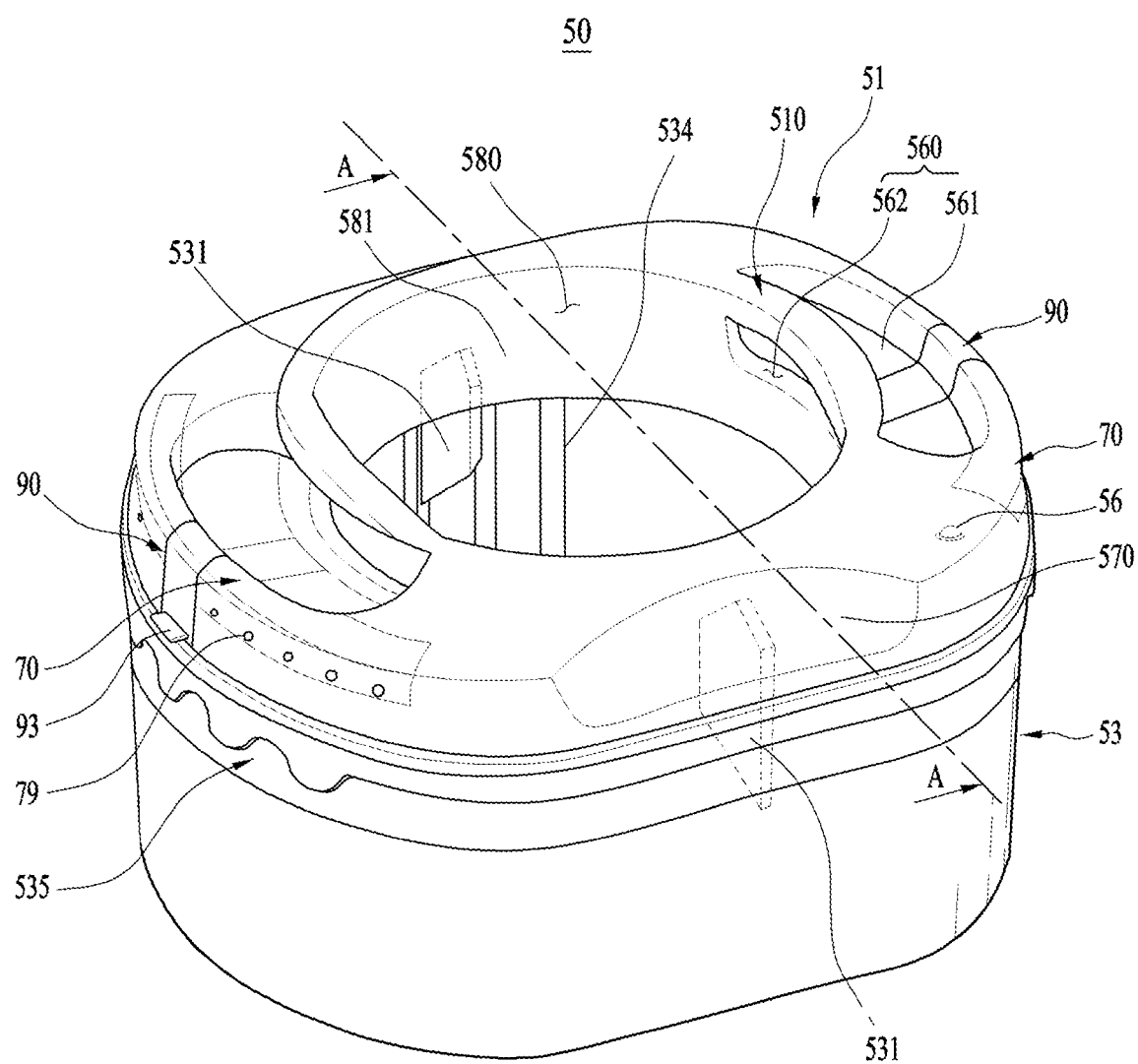
FIG. 2 is a perspective view of an auxiliary drum shown in FIG. 1.

FIG. 2 is a perspective view of the auxiliary drum 50 shown in FIG. 1. FIG. 3 is a cross-sectional view along a line A-A shown in FIG. 2. FIG. 4 is a top view of the auxiliary drum 50 mounted on the main drum 30.

Figure 3:
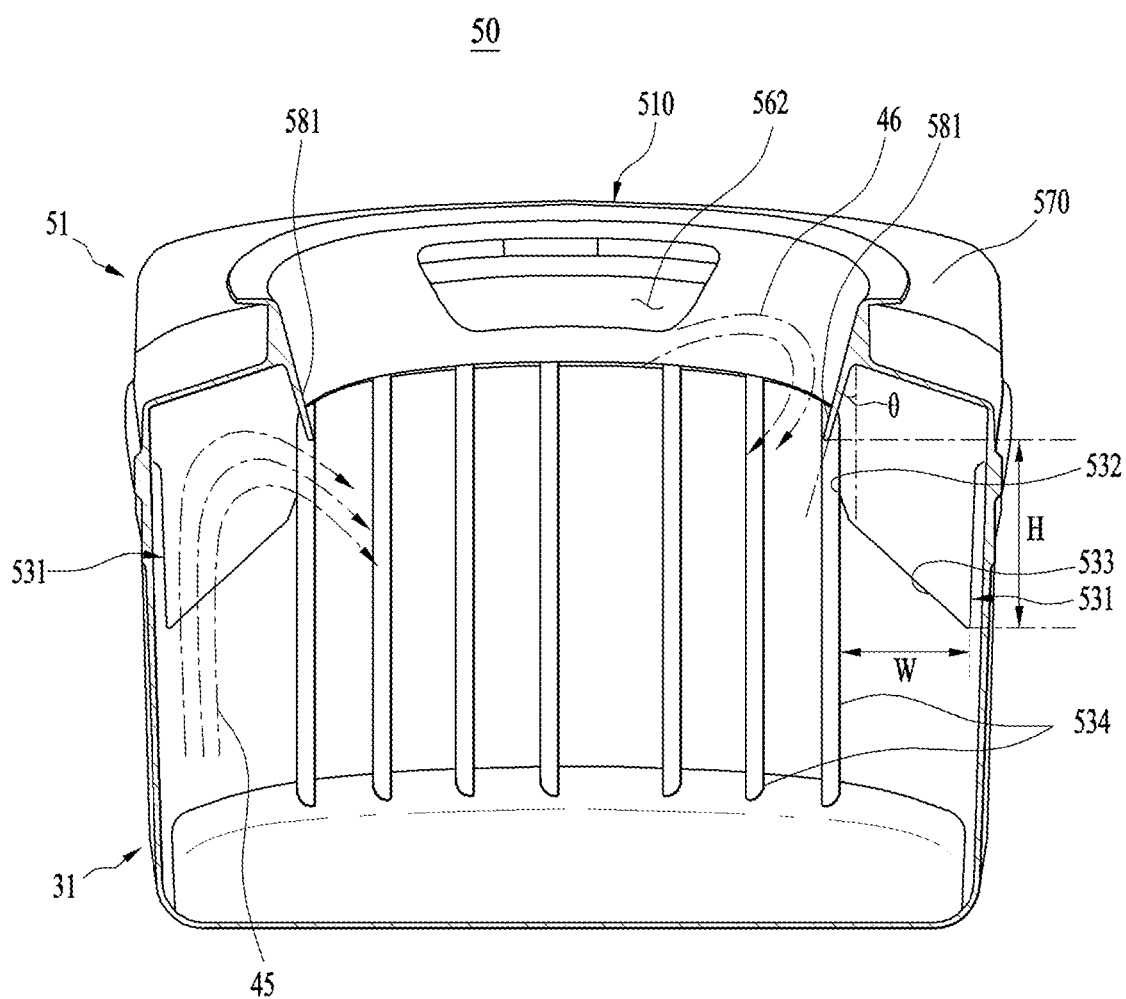
FIG. 3 is a cross-sectional view along a line A-A shown in FIG. 2.
Figure 4:
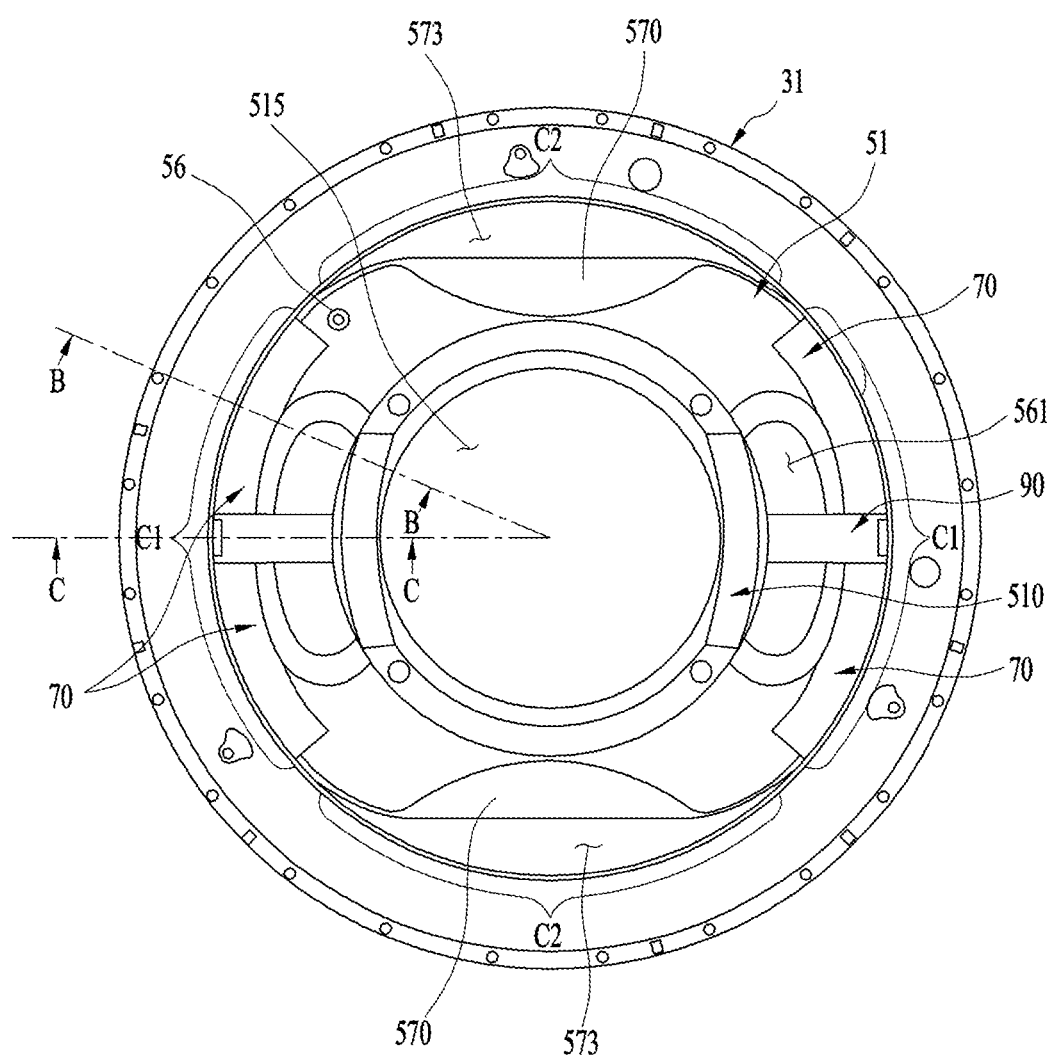
FIG. 4 is a top view of the auxiliary drum mounted in a main drum.

Referring to FIG. 2 to FIG. 4, the auxiliary drum 50 is configured to be detachable or attachable from or to the inside of the main drum 30 and is provided on a top of the main drum 30. The auxiliary drum 50 is formed into a cylindrical shape whose a top is open and whose a transverse section is approximately elliptical.

The auxiliary drum 50 is configured to perform a washing process separately from the main drum 30. Accordingly, the laundry is classified according to the color or the material and is then divided and input into the main drum 30 and the auxiliary drum 50, and is washed simultaneously by the main drum and the auxiliary drum. Thus, washing-water, detergent, and energy waste can be prevented while the number of operations of the laundry treating apparatus 1 is reduced.

Further, the auxiliary drum 50 receives the rotational force from the main drum 30 to rotate and perform the washing. Therefore, the auxiliary drum does not require a separate driving device.

The auxiliary drum 50 includes an auxiliary drum body 53 formed of an hollow cylindrical body with an open top, an auxiliary drum cover 51 detachably coupled to the top of the auxiliary drum body 53, a water discharge mechanism 70 for discharging the washing-water inside the auxiliary drum 50 to the outside during the high-speed rotation of the auxiliary drum 50, and a locking mechanism 90 for engaging and disengaging the auxiliary drum 50 seated in the main drum 30 with the main drum 30.

The auxiliary drum body 53 is formed in an elliptical shape at a transverse section thereof so as to form a swirling flow of washing water. On the inner circumferential surface of the drum body, a friction rib 534 is provided to generate the flow of the washing water.

In the case of a top loading type such as the laundry treating apparatus 1 according to one embodiment of the present disclosure, Not only is washing done by the chemical action of the detergent but also washing occurs due to friction between washing-water and laundry caused by water flow generated by the drum rotation and the like. Since the auxiliary drum body 53 has a substantially elliptical transverse section, the auxiliary drum body generates a vortex more effectively via rotation than a drum having a transverse section formed in a circular shape. The friction between washing-water and laundry may increase via the vortex. Thus, the washing ability may be increased using the elliptical transverse section of the auxiliary drum 50.

In one embodiment, as shown in FIG. 4, the inner circumferential face of the auxiliary drum 50 may be divided into a first curvature portion C1 formed to have a first curvature and a second curvature portion C2 formed to have a second curvature smaller than the first curvature.

A pair of first curvature portions C1 are provided at opposite sides of the circumferential surface of the auxiliary drum body 53, respectively. The first curvature is formed to correspond to the curvature of the circumferential surface of the opening formed in the main drum cover 31.

A pair of second curvature portions C2 are provided at opposite sides of the circumferential surface of the auxiliary drum body 53. Each second curvature portion C2 is located between the pair of first curvature portions C1. The second curvature is formed to be smaller than the first curvature.

That is, the first curvature portions C1 and the second curvature portions C2 are arranged alternately in a circumferential direction of the auxiliary drum body 53.

Further, the inner circumferential face of the auxiliary drum body 53 may include a smaller spacing portion C2 spaced by a first distance from a rotation center of the auxiliary drum 50, and a larger spacing portion C1 spaced by a second distance greater than the first distance from the rotation center of the auxiliary drum 50. In this case, the larger spacing portion C1 corresponds to the first curvature portion C1, while the smaller spacing portion C2 corresponds to the second curvature portion C2.

In one embodiment, the smaller spacing portion C2 and the inner circumferential face of the drum-cover 31 are spaced apart from each other by a sufficient distance. Thus, a first water-supply channel 573 to be described later is formed.

In the above embodiment, the second curvature portion C2 of the inner circumferential surface of the auxiliary drum body 53 is formed as a curved surface. The present disclosure is not limited thereto. The second curvature portion C2 may have a flat surface rather than a curved surface. When the second curvature portion C2 has a flat face, a name of the second spacing portion C2 may be more appropriate than a name of the second curvature portion C2.

As used herein, the first curvature portion C1, the second curvature portion C2, the larger spacing portion C1, the smaller spacing portion C2, the contact portion C1 and the spaced portion C2 indicate the specific regions of the auxiliary drum 50. When a specific region is included in the specific region of the auxiliary drum 50, the specific region may be named using the above term. As used herein, portions of the auxiliary drum body 53 and the auxiliary drum cover 51 are designated using the above terms.

The through-holes 33 are not provided in the circumferential face of the auxiliary drum body 53, unlike the case in which the through-holes 33 are provided in the circumferential face of the main drum 30. Thus, the auxiliary drum body 53 may accommodate the washing water and the laundry therein. The washing water is not discharged into the main drum 30 through the circumferential face or the lower face. Thus, the washing water contained in the tub 20 is only injected into the main drum 30 through the through-holes 33 while the washing water is not injected into the auxiliary drum 50.

The friction ribs 534 protrude from the inner circumferential face of the auxiliary drum body 53 and extend up and down. The plurality of friction ribs 534 are spaced apart at regular intervals. The ribs may be formed integrally with the auxiliary drum body 53. During the rotation of the auxiliary drum body 53, the washing water is rotated in the direction of rotation of the auxiliary drum body 53 by the friction force between the washing water and the friction ribs 534. The friction rib 534 is different in shape and function from a guide rib 531 to be described later.

The auxiliary drum cover 51 is coupled to the top of the auxiliary drum body 53. The transverse section of the auxiliary drum cover 51 is identical with the transverse section of the auxiliary drum body 53.

Thus, the circumferential surface of the auxiliary drum cover 51 is divided into a first curvature portion C1 and a second curvature portion C2. The first curvature portion C1 may be referred to as a larger spacing portion C1. The second curvature portion C2 may be referred to as a smaller spacing portion C2. Furthermore, unlike the first curvature portion C1 and the second curvature portion C2 of the auxiliary drum body 53, the first curvature portion C1 of the auxiliary drum cover 51 contacts the inner peripheral surface of the main drum cover 31. Thus, the first curvature portion C1 of the auxiliary drum cover 51 may be designated as the contact portion C1. The second curvature portion C2 is spaced from the inner circumferential surface of the main drum cover 31. Thus, the second curvature portion C2 may be referred to as a spaced portion C2.

The auxiliary drum cover 51 may include a laundry inlet 580 formed in the top face thereof for the laundry input therein, and an inclined guide 581 formed along the inner circumferential face of the laundry inlet 580. The auxiliary drum cover 51 further includes a handle portion 510 that provides a space for the user to grip. The auxiliary drum cover 51 may further include an inner water-supply guide 560 for guiding the washing water discharged from the water-supply 18 to the inside of the auxiliary drum 50. Further, the auxiliary drum cover 51 may include an outer water-supply guide 570 for guiding the washing water discharged from the water-supply 18 to the inside of the main drum 30 through the outside of the auxiliary drum 50. The auxiliary drum cover 51 may include a guide rib 531 configured such that the washing water circulating along the inner circumferential face of the auxiliary drum body 53 changes its direction of flow via the collision with the guide rib 531 and is pulled upwards to a top and then falls from the top to the center of the auxiliary drum body 53.

A pair of handle portions 510 are formed on the top face of the auxiliary drum cover 51. The handle portion 510 includes a bar-shaped actuating portion (not shown) disposed movably in an up and down direction within the handle portion. As the actuating portion moves up and down, the fixing means 93 may be inserted or withdrawn.

The handle portion 510 is provided adjacent the first curvature portion C1 of the auxiliary drum cover 51, i.e., the larger spacing portion C1 thereof. The impact occurring in separating the auxiliary drum 50 from the main drum 30 may cause the washing water to be biased toward one side. In this case, the auxiliary drum 50 may roll to shake in a left and right direction while rotating around a virtual axis passing through the pair of the larger spacing portions C1. Thus, when the handle portion 510 is provided adjacent to the second curvature portion C2, i.e., the smaller spacing portion C2, the user has to apply a lot of force to suppress the vertical vibration of the auxiliary drum 50. For this reason, the handle portion 510 is advantageously provided adjacent to the larger spacing portion C1.

The inner water-supply guide 560 is provided in the top face of the auxiliary drum cover 51. The guide 560 is provided adjacent to the larger spacing portion C1, i.e., the contact portion C1. The inner water-supply guide 560 includes a recess 561 and a water-supply hole 562.

The recess 561 is formed by recessing a part of the top face of the auxiliary drum cover 51 so that after the washing water discharged from the water-supply 18 collides with the top face of the auxiliary drum cover 51, the water does not scatter around the top face of the auxiliary drum cover 51.

The water-supply hole 562 is formed on the inner face of the recess 561 with facing the laundry inlet 80. The hole 562 may be formed to communicate the laundry inlet 580 and the recess 561. Thus, as the washing water is guided from the recess 561 through the water-supply hole 562 to the laundry inlet 580, the water-supply hole 562 forms a second water-supply channel 562 that guides the washing water to the auxiliary drum 50.

Thus, the washing water as discharged from the water-supply 18 is temporarily stored in the recess 561 so that it is not scattered around the auxiliary drum cover 51. Thereafter, the wash water is discharged through the water-supply hole 562, i.e., the second water-supply channel 562, into the laundry inlet 580 and then into the auxiliary drum 50.

In one embodiment, the recess 561 and the water-supply hole 562 are formed under the handle portion 510. This maximizes the space efficiency of the auxiliary drum cover 51.

The outer water-supply guide 570 is provided on the auxiliary drum cover 51. The guide 570 is provided adjacent to the smaller spacing portion C2, that is, the spaced portion C2. That is, the outer water-supply guide 570 is spaced from the inner water-supply guide 560. The auxiliary drum 50 rotates together with the main drum 30 by a predetermined angle such that each of the inner water-supply guide 560 and the outer water-supply guide 570 is positioned below the single water-supply 18. Therefore, although the outer water-supply guide 570 is provided separately from the inner water-supply guide 560, the washing water discharged from the single water-supply 18 may be supplied to the main drum 30 and the auxiliary drum 50, respectively.

The outer water-supply guide 570 may be formed by recessing the edge portion of the spaced portion C2 toward the inside of the auxiliary drum cover 51. The outer water-supply guide 570 has a bottom face as an outwardly and downwardly sloping face. Thus, when the washing water is discharged from the water-supply 18, the washing water is guided to the inside of the main drum 30 through the first water-supply channel 573 defined as a space formed between the spaced portion C2 and the outer peripheral surface of the main drum 30.

The guide rib 531 is formed in a plate shape and is provided below the top face of the auxiliary drum cover 51 and extends downward. Further, the guide rib 531 is provided such that one side thereof contacts the inner circumferential face of the auxiliary drum body 53. In other words, the plate-shaped guide rib 531 has its upper side engaged with the auxiliary drum cover 51 and its one side contacting the inner circumferential face of the auxiliary drum body 53. Accordingly, the washing water inside the auxiliary drum body 53 may be rotated along the inner circumferential face of the auxiliary drum body 53 by the rotational force of the auxiliary drum 50, and, then, the washing water may flow upward due to the collision with the guide rib 531, and, then, the washing water may drop along a parabolic curve toward the center of the auxiliary drum 50.

Specifically, the guide rib 531 includes a rib vertical portion 532 formed on one side face toward the center of the auxiliary drum body 53 and extending downward from the top face of the auxiliary drum cover 51, and a rib inclined portion 533 formed on the bottom face toward the bottom of the auxiliary drum body 53, wherein the portion 533 extends from the rib vertical portion 532 downwardly toward the inner circumferential face of the auxiliary drum body 53.

The rib inclined portion 533 forms an acute angle with the inner circumferential face of the auxiliary drum body 53. The portion 533 is formed to be spaced apart from the bottom face of the auxiliary drum body 53.

As the rib inclined portion 533 is formed on the bottom face of the guide rib 531, the laundry that rotates together with the washing water inside the auxiliary drum body 53 is less interfered. Thus, the laundry flows more smoothly. This may increase the friction between the laundries and, thus, increase the washing power.

In one embodiment, even when the guide rib 531 includes the rib inclined portion 533, a sufficient amount of the washing water may be elevated. For example, when the auxiliary drum 50 rotates at high speed, the water level of the washing water on the inner circumferential face of the auxiliary drum body 53 is higher than the water level of the washing water in the center of the auxiliary drum body 53. Therefore, even when the guide rib 531 has the rib inclined portion 533, the sufficient amount of the washing water may rise up via colliding against the guide rib 531.

In one embodiment, when the auxiliary drum 50 rotates at a relatively low speed, a sufficient amount of the washing water can be raised up by placing the guide rib 531 in the smaller spacing portion C2 of the auxiliary drum cover 51. The amount of the washing water passing through the imaginary cross section from the center of the auxiliary drum body 53 to the smaller spacing portion C2 may be equal to the amount of washing water passing through the imaginary cross-section from the center of the auxiliary drum body 53 to the larger spacing portion C1.

Thus, a height of the washing water when the wash water passes through an imaginary cross-section from the center of the auxiliary drum body 53 to the smaller spacing portion C2 is larger than that when the wash water passes through the imaginary cross-section from the center of the auxiliary drum body 53 to the larger spacing portion C1. Thus, even when the auxiliary drum 50 rotates at a relatively low speed, the guide rib 531 may lift up the sufficient amount of the washing water.

Further, one face of the guide rib 531 where the guide rib collides with the washing water, and the other face located opposite said one face may be formed with an upward slope toward the direction of the washing water, respectively. That is, when the guide rib 531 is viewed along the radial direction from the center of the auxiliary drum body 53, the width of the lower cross-section thereof may be greater than the width of the upper cross-section thereof. Thus, the washing water may more easily rise up along the one face and the other face of the guide rib 531.

According to the experiment, when a length dimension of the auxiliary drum 50 is 399 mm and the height of the auxiliary drum is 309.2 mm in FIG. 3, a configuration in which the height H of the guide rib 531 is 70 mm and the width W of the guide rib is 65 mm exhibits high washing power in conjunction with an inclined guide 581 to be described later. An experiment is executed in a state in which the dimension values were the same as the above values except that the height H of guide rib 531 was set to 50 mm and 90 mm, respectively. Experimental results show that although more excellent washing power is exhibited in terms of removing some pollutants, an average value of the washing power is lower than a value of the washing power when the height H of the guide rib 531 is set to 70 mm. By way of example, these dimension values are only examples set from the experiments. Specific dimension values of the auxiliary drum 50 and the guide rib 531 are not limited thereto.

Each guide rib 531 is provided in each of the smaller spacing portions C2 as described above. That is, a pair of guide ribs has been described, but the present disclosure is not limited thereto. Each guide rib is further mounted on each of the larger spacing portions C1. Thus, a total of two pairs of guide ribs may be formed.

The inclined guide 581 is provided above the guide rib 531 and formed to be inclined downward toward the inside of the auxiliary drum 50. Specifically, the inclined guide 581 is formed along the inner side, that is, an inner peripheral surface of the laundry inlet 580 located above the guide rib 531.

When the inclined guide 581 is absent, washing-water elevated by the guide rib 531 is moved 51 through an upper portion of the inner circumferential surface of the auxiliary drum body 53 and along a bottom face of the auxiliary drum cover toward the center of the auxiliary drum body 53 and then falls freely into the inside of the auxiliary drum body 53.

When the inclined guide 581 is installed, washing-water does not fall freely. That is, the wash-water moves horizontally along the bottom face of the auxiliary drum cover 51 and then rapidly diverges downwardly via encountering a lower face of the inclined guide 581. This flow is denoted by a reference numeral 45. That is, a portion of the horizontal direction velocity component is converted into a vertical direction velocity component. The washing-water whose the direction of movement suddenly changes more strongly collides with the laundry received in the auxiliary drum body 53 than when water falls freely. In this connection, an inclination angle θ of the inclined guide 581 with respect to the direction in which gravity acts may be set to approximately 10 degrees. The angle at which the moving direction of washing-water is changed is larger than the inclination angle. As a result, a very strong impact is transmitted to the laundry received in the auxiliary drum body, thereby increasing the washing power.

The inclination angle θ is approximately 10 degrees. However, this numerical value is merely an example. The present disclosure is not limited to the numerical value.

In one example, when the auxiliary drum 50 rotates at a very high rotational speed, the washing-water received inside the auxiliary drum 50 collides with each other and bounces toward the laundry inlet 580 side. In this connection, the inclined guide 581 serves to guide the bounced washing water along its top face to move into the auxiliary drum 50.

Figure 5:
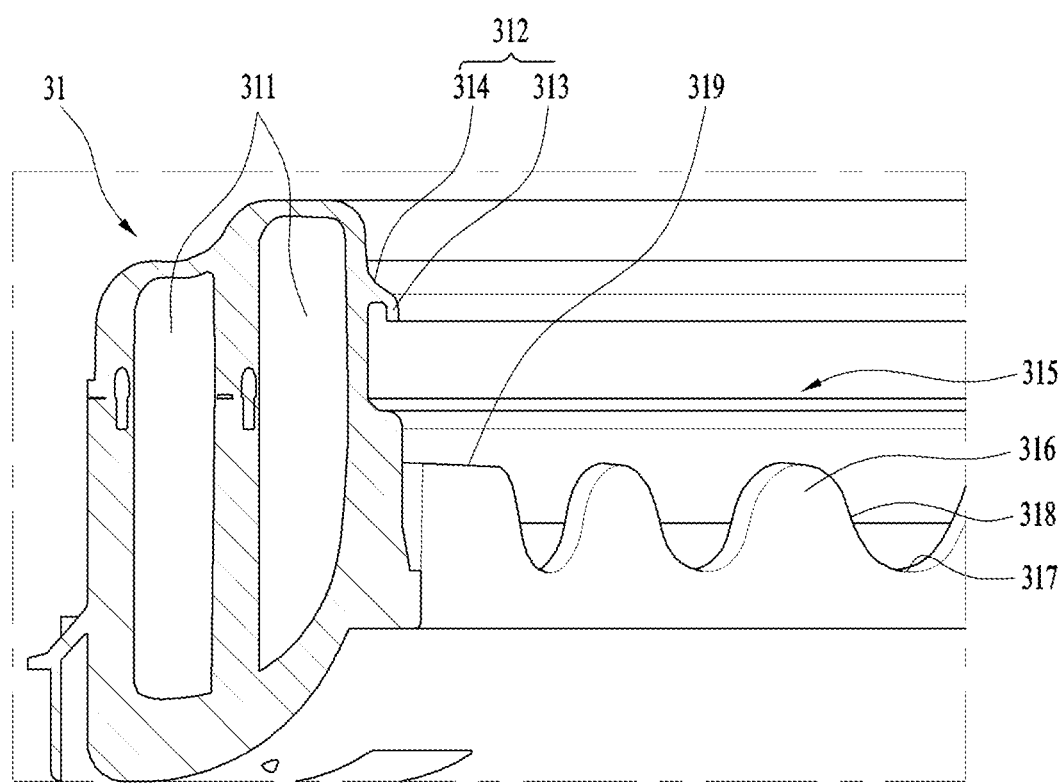
FIG. 5 is a partial cutaway perspective view showing an inner circumference of a main drum cover to illustrate a first convex-concave portion.
Figure 6:
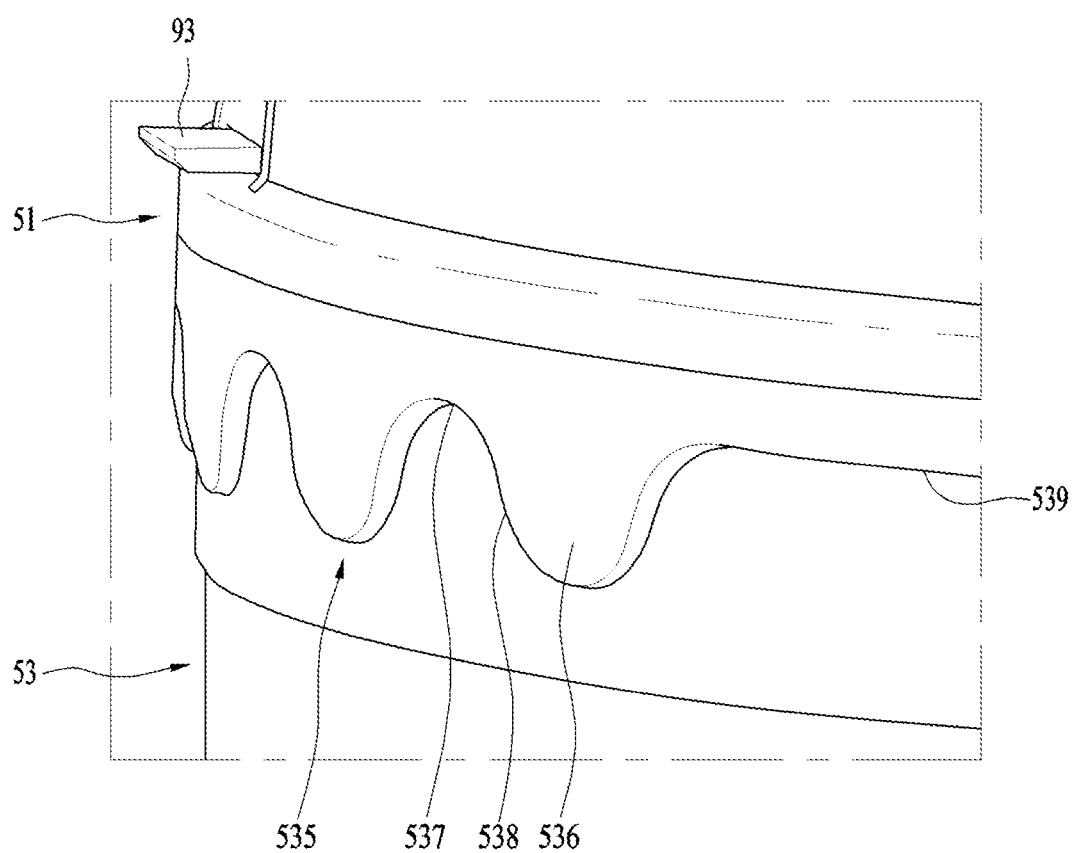
FIG. 6 is a partial perspective view of an outer circumference of the auxiliary drum to illustrate a second convex-concave portion.

Hereinafter, a configuration in which the auxiliary drum 50 is detached from or attached to the main drum 30 will be described with reference to FIG. 5 and FIG. 6. FIG. 5 is a partially cutaway perspective view showing the inner circumferential surface of a main drum cover 31 to illustrate the first convex-concave portion 315. FIG. 6 is a partial perspective view showing the outer circumferential surface of the auxiliary drum 50 to illustrate a second convex-concave portion 535.

Referring to FIG. 5 and FIG. 6, the main drum 30 includes a first convex-concave portion 315 formed on the inner circumferential surface thereof. The auxiliary drum 50 includes a second convex-concave portion 535 formed on the outer circumferential surface thereof and configured to be engaged with the first convex-concave portion 315.

Specifically, the second convex-concave portion 535 is formed on the contact portion C1 of the outer circumferential face of the auxiliary drum body 53, while the first convex-concave portion 315 is formed on the inner circumferential face of the main drum cover 31. The second convex-concave portion 535 is preferably not formed on the outer circumferential face of the auxiliary drum cover 51. This is because, otherwise, the auxiliary drum cover 51 may be separated from the auxiliary drum body 53 due to the weight of washing-water and laundry received in the auxiliary drum body 53.

The first convex-concave portion 315 includes at least one first convex portion 316, at least one first concave portion 317, and a first inclined connection portion 318 for connecting the first convex portion 316 and the first concave portion 317. The first inclined connection portion 318 may not be curved but flat.

The first convex portion 316 is formed to be convexly curved upwards. The first concave portion 317 has a shape corresponding to the first convex portion 316 and is formed to be concavely curved downwards.

The second convex-concave portion 535 is formed in a shape corresponding to the shape of the first convex-concave portion 315. The second convex-concave portion 535 includes at least one second convex portion 536, at least one second concave portion 537 corresponding to at least one second convex portion 536 and formed in a concave shape, and a second inclined connection portion 538 connecting the second convex portion 536 and the second concave portion 537.

The second convex portion 536 is curved downwardly convexly. The second concave portion 537 has a shape corresponding to the second convex portion 536 and is formed to be concavely curved upwards.

The second convex-concave portion 535 is formed in a shape corresponding to the first convex-concave portion 315. When the auxiliary drum 50 is seated on the main drum 30, the second convex portion 536 is seated on the first concave portion 317, while the second concave portion 537 rests on the first convex portion 316.

A peak of the second convex portion 536 and a peak of the first convex portion 316 each has a substantially horizontal portion. When the user tries to seat the auxiliary drum 50 on the main drum 30, there is a problem that when these horizontal portions meet each other, the second convex portion 536 is not easily seated on the first concave portion 317.

For example, when a peak curvature of each of the curved portions of the first convex portion 316 and the second convex portion 536 is too small, the horizontal portion may occupy a large area. Thus, when the user tries to seat the auxiliary drum 50 on the main drum 30, the second convex portion 536 may not be seated on the first concave portion 317 and may be seated on the peak of the first convex portion 316.

However, when each the peak curvatures of the curved portions of the first convex portion 316 and the second convex portion 536 are sufficiently large, and when these horizontal portions meet each other, the second convex portion 536 may slide along the first inclined connection portion 318 to be seated easily on the first concave portion 317.

Accordingly, the size and shape of the first convex-concave portion 315 and the second convex-concave portion 535 need to be appropriately adjusted. For example, as for the second convex-concave portion 535, five second protrusions 754 are formed on each of the two contact portions C1. A spacing between the second protrusions 754 is approximately 35 mm. A length from the lowermost end of the second concave portion 537 to the peak of the second convex portion 536 may be approximately 17.5 mm.

In one example, as the second convex-concave portion 535 engages the first convex-concave portion 315 and seats on the first convex-concave portion 315, the auxiliary drum 50 is rotated by the rotational force of the main drum 30. In this case, for example, when the main drum 30 rotates at a high speed, the second convex portion 536 may move upward along the first inclined connection portion 318. Accordingly, the auxiliary drum 50 may be disengaged from the main drum 30 due to the high-speed rotation of the main drum 30.

This phenomenon may occur when the inclined angle of the first inclined connection portion 318 is too large with respect to the gravitational direction. To prevent this phenomenon, for example, the first inclined connection portion 318 may be formed to be inclined by about 10 degrees with respect to the gravity direction.

The second inclined connection portion 538 is likewise formed to be inclined by about 10 degrees with respect to the direction of gravity. Thus, the frictional force between the second inclined connection portion 538 and the first inclined connection portion 318 when they are in close contact with each other may be increased.

The second inclined connection portion 538 may extend parallel to the direction of gravity. In this case, when the auxiliary drum 50 seats on the main drum 30, the auxiliary drum may collide with the main drum 30. Therefore, such a configuration is not preferable.

While the auxiliary drum 50 is seated on the main drum 30, the auxiliary drum is fastened to the main drum 30 via the locking mechanism 90 which will be described later. Thus, it is possible to prevent the main drum 30 from being separated from the main drum 30.

The contact portion C1 of the auxiliary drum cover 51, that is, the larger spacing portion C1 thereof seats on the inner circumferential face of the auxiliary drum 50. The spaced portion C2, i.e., the smaller spacing portion C2 thereof is spaced from the outer circumferential face of the auxiliary drum 50. Therefore, when the auxiliary drum 50 rotates at a high speed, the smaller spacing portion C2 may oscillate up and down, unlike the larger spacing portion C1, due to the position of laundry and washing-water as biased. In other words, when the longest distance between the larger spacing portions C1 of the auxiliary drum body 53 is regarded as a length, a kind of rolling phenomenon may occur.

In this connection, each of the first convex portion 316, the first concave portion 317, the second convex portion 536, and the second concave portion 537 is formed to be angled, the first convex portion 316 and the second convex portion 536 may rotate slightly in the second concave portion 537 and the first concave portion 317, respectively due to the rolling phenomenon. Thus, the angled portions of the first convex portion 316 and the second convex portion 536 may cause stress to concentrate on portions of the second concave portion 537 and first concave portion 317, resulting in brittle fracture. Thus, loads of the curved first concave portion 316 and the second convex portion 536 and the curved second concave portion 537 and the first concave portion 317 having the same curvature as those of the curved first concave portion 316 and the second convex portion 536 are uniformly dispersed, thereby significantly preventing the stress concentration. Thus, excellent strength is secured.

When the rolling phenomenon occurs, the first convex portion 316 and the second convex portion 536 may be relatively easily rotated while being received within the second concave portion 537 and the first concave portion 317, respectively since the first convex portion 316 and the second convex portion 536 are formed to be curved. Accordingly, the first convex portion 316 and the second convex portion 536 are separated from the second concave portion 537 and the first concave portion 317, and then rise slightly along the second inclined connection portion 538 and the first inclined connection portion 318. As a result, the contact areas of the first convex portion 316 and the second convex portion 536 may be slightly reduced. As a result, the stress is still concentrated.

Therefore, in order to prevent the rolling phenomenon that the larger spacing portion C1 of the auxiliary drum body 53 vibrates up and down, both first tilting-preventing portions 319, and both second tilting-prevention portions 539 in a face contact with the first tilting-preventing portion 319 may be provided both ends of the first convex-concave portion 315 and both ends of the second convex-concave portion 535 respectively.

This first tilting-preventing portion 319 protrudes from the inner circumferential face of the main drum cover 31, like the first convex-concave portion 315. The first tilting-preventing portion 319 further extends in the direction in which the auxiliary drum 50 rotates. The first tilting-preventing portion 319 has a top face that is flat to face-contact the second tilting-prevention portion 539.

The second tilting-preventing portion 539 protrudes from the outer circumferential face of the auxiliary drum body 53, like the second convex-concave portion 535.

The second tilting-preventing portion 539 extends parallel to the direction in which the first tilting-preventing portion 319 extends. The second tilting-prevention portion 539 has a bottom face in a face contact with the top face of the first tilting-prevention portion 319.

Figure 7:
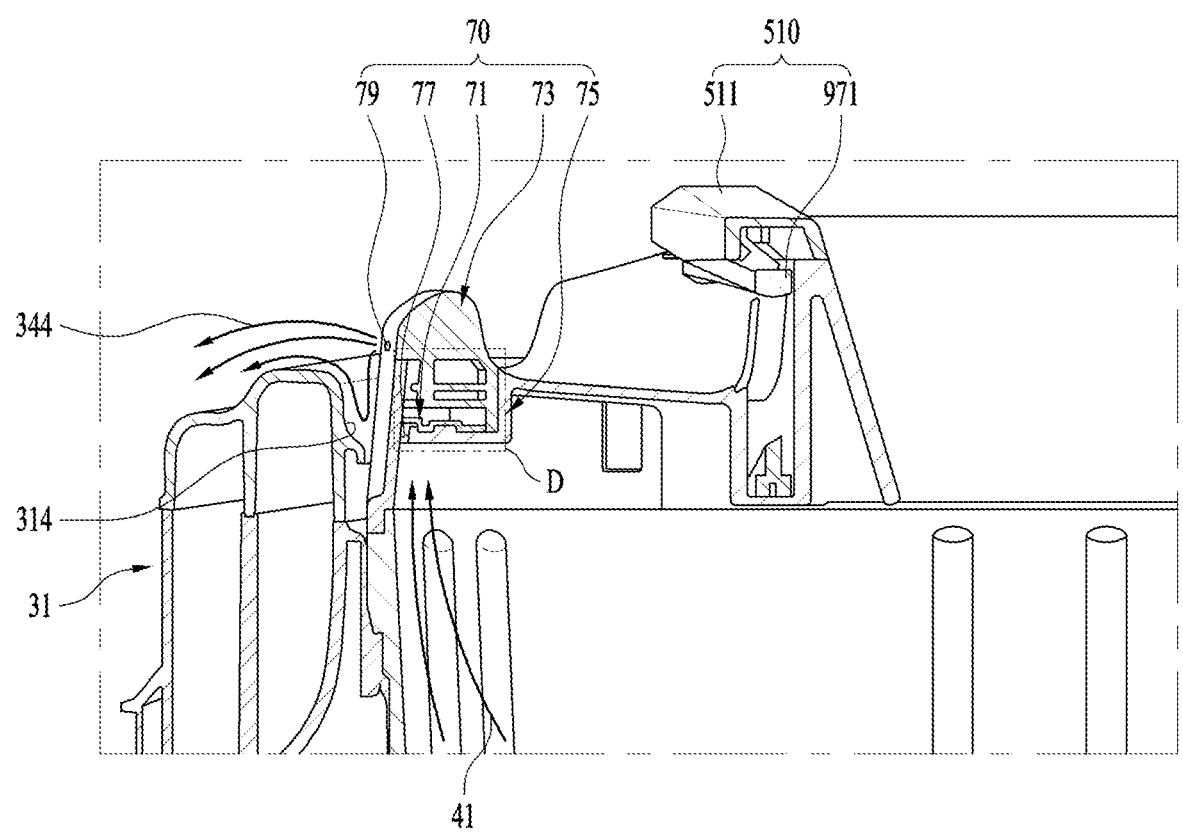
FIG. 7 is a partial cross-sectional view along a line B-B shown in FIG. 4 to illustrate a water discharge mechanism.
Figure 8:
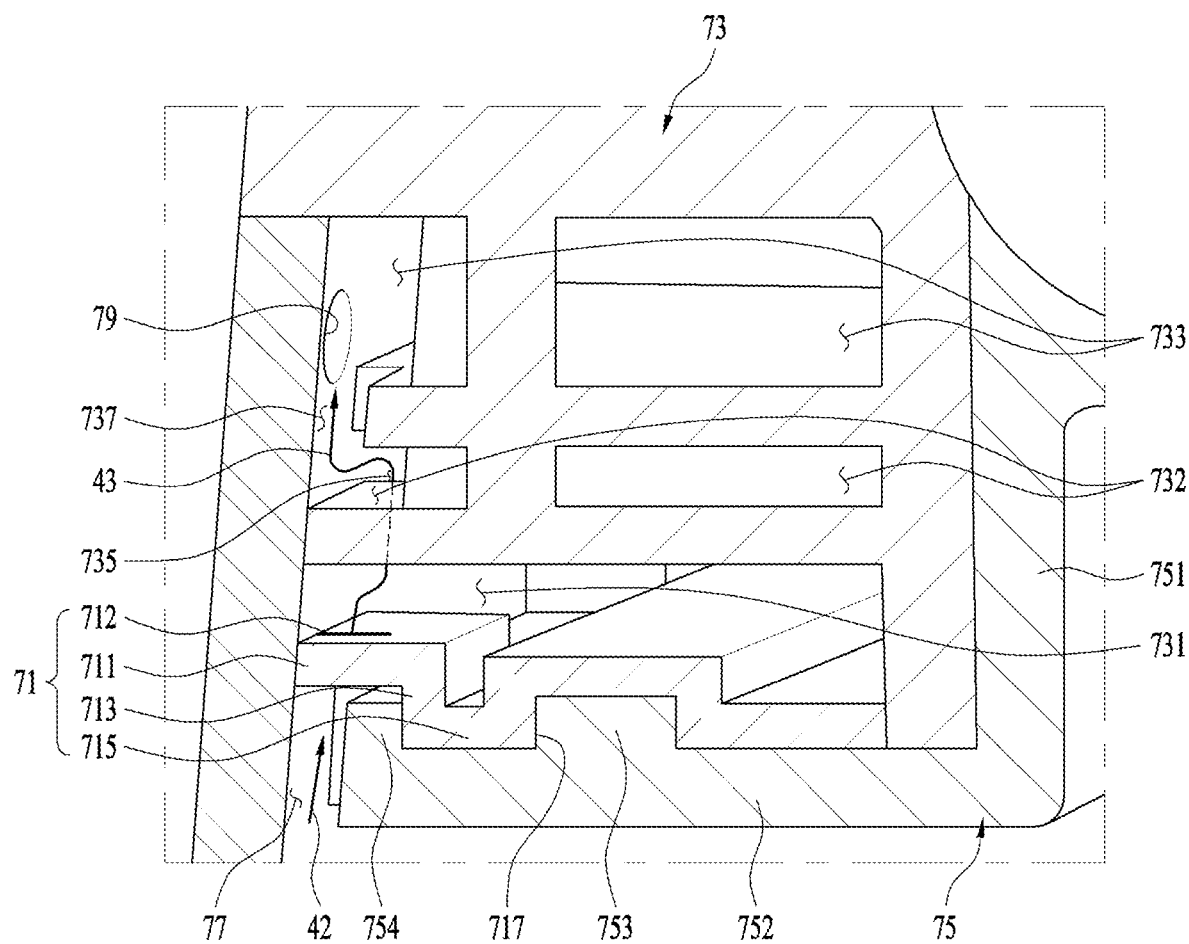
FIG. 8 is an enlarged view of a part D of FIG. 7 to illustrate an example of a water discharge mechanism.
Figure 9:
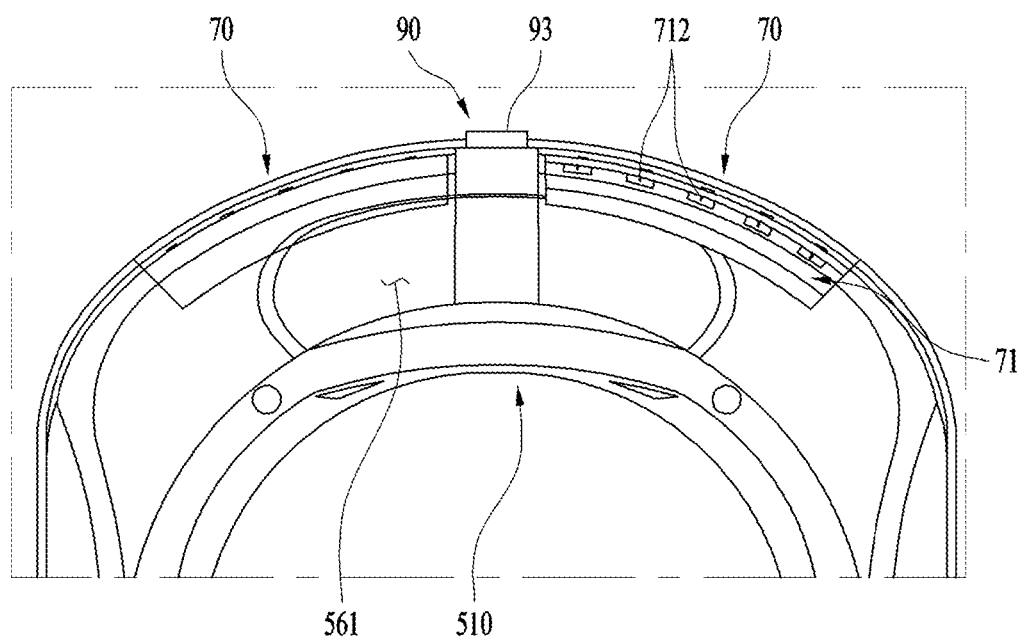
FIG. 9 is a partial cut-away plan view to illustrate the water discharge mechanism.

Hereinafter, an example of the water discharge mechanism 70 will be described in detail with reference to FIGS. 7 to 9. FIG. 7 is a partial cross-sectional view along a line B-B shown in FIG. 4 to illustrate the water discharge mechanism. FIG. 8 is an enlarged view of a part D of FIG. 7 to illustrate an example of a water discharge mechanism. FIG. 9 is a partial cut-away plan view to illustrate the water discharge mechanism shown in FIG. 8.

Referring to FIGS. 7 to 9, a pair of water discharge mechanisms 70 are adjacent to a pair of first curvature portions C1, that is, a pair of larger spacing portions C1 respectively. The water discharge mechanism 70 selectively discharges the washing water to the outside of the auxiliary drum 50 according to the magnitude of the centrifugal force due to the rotation of the auxiliary drum 50.

The water discharge mechanism 70 includes a water receiving hole 77 for receiving washing-water rising along the inner circumferential face of the auxiliary drum body 53, a check valve 71 for selectively passing therethrough washing water having passed through the water receiving hole 77, chambers 732 and 733 acting as flow resistance against washing-water having passed through the check valve 71, through-holes 735 and 737 for communicating between the chambers 732 and 733, a water-discharging hole 79 for discharging washing-water having passed through the chambers 732 and 733 to the outside of the auxiliary drum 50, and a seat portion 75 on which the check valve 71 is seated.

The seat portion 75 may be provided at the edge of the auxiliary drum cover 51. In addition, the seat portion 75 may extend radially inwardly from the side wall of the auxiliary drum. The height of the seat portion is determined such that wash water may be introduced into the water discharge mechanism 70 even when the washing-water rises up to a certain height along the inner circumferential face of the auxiliary drum body 53. Considering that the highest water level of washing-water is set to be lower than the auxiliary drum cover 51, the seat portion 75 may be formed to be positioned below the top face of the auxiliary drum cover 51 as shown in FIG. 7.

The seat portion 75 includes a vertical extension 751 extending downward from the top face of the auxiliary drum cover 51, and a horizontal extension 752 extending approximately horizontally from one end of the vertical extension 751 towards an edge of the auxiliary drum 50. The vertical extension 751 extends downward from the bottom of the recess 561.

The horizontal extension 752 defines the bottom face of the seat portion 75 and is connected to the lower end of the vertical extension 751. The horizontal extension 752 has a first protrusion 753 and a second protrusion 754 projecting upwards. The first protrusion 753 is inserted into a receiving hole 717 of the check valve 71 to be described later. The second protrusion 754 interferes with a rotatable portion 713, which will be described later.

A water receiving hole 77 is formed in the horizontal extension 752. The hole 77 is formed adjacent to an inner circumferential face of the auxiliary drum body 53 to receive washing-water rising along the inner circumferential face of the auxiliary drum body 53.

The check valve 71 is seated on the seat portion 75. One end of the check valve contacts the inner circumferential face of the auxiliary drum body 53. The check valve 71 includes a shrinkable portion 711 that shrinks by centrifugal force, a slit 712 formed to pass through the shrinkable portion 711 and allowing washing-water to pass therethrough, a rotatable portion 713 connected to the shrinkable portion 711 and rotating in the direction of centrifugal force, and a horizontal support 715.

One end of the shrinkable portion 711 contacts the inner circumferential face of the auxiliary drum body 53. The shrinkable portion 711 is made of a soft material so that it can be shrunk by externally applied force. In this connection, the external force refers to the centrifugal force due to the rotation of the auxiliary drum 50.

The shrinkable portion 711 may be oriented at various angles on the seat portion 75. The shrinkable portion 711 extends along the direction in which the centrifugal force acts such that the shrinkable portion 711 sufficiently shrinks when the centrifugal force acts. A plurality of shrinkable portions 711 may be arranged along the outer circumferential face of the auxiliary drum cover 51, as shown in FIG. 9.

The slit 712 extends through the shrinkable portion 711. The slit is formed to open via shrinking of the shrinkable portion 711. Particularly, the slit 712 is formed along the direction in which the centrifugal force acts so that the slit 712 is effectively opened when the centrifugal force acts.

When the centrifugal force acts on the shrinkable portion 711, the slit 712 may be opened while both opposite side portions of the slit 712 move in a direction away from the slit 712.

One end of the rotatable portion 713 is connected to the shrinkable portion 711 and the other end thereof is connected to the horizontal support 715. The rotatable portion 713 is formed so as to be perpendicular to the direction in which the centrifugal force acts. In this connection, the horizontal support 715 to be described later is fixed to the seat portion 75.

There may be no rotatable portion 713, and the horizontal support 715 may be fixed to the horizontal extension 752. The horizontal support 715 may be arranged with the shrinkable portion 711 in a side-by-side arrangement in the direction in which the centrifugal force acts. In this case, when the centrifugal force acts, the horizontal support 715 pulls the shrinkable portion 711 in a direction opposite to the direction in which the centrifugal force acts. Thus, there is a problem that the shrinkable portion 711 cannot shrink sufficiently.

In order to solve this problem, one end of the rotatable portion 713 connected to the shrinkable portion 711 is configured to be rotatable using a small force about the other end of the rotatable portion 713 fixed to the seat portion 75. Thus, the rotatable portion 713 serves to allow the shrinkable portion 711 to shrink more smoothly.

The material of the shrinkable portion 711 of the check valve 71 and the length of the rotatable portion 713 thereof may be determined such that the slit 712 may be opened at a spinning rpm higher than the washing rpm.

The horizontal support 715 is configured to be in a face contact with the horizontal extension 752 of the seat portion 75. Below the horizontal support 715, the receiving hole 717 is defined which receive the first protrusion 753 of the seat portion 75. The horizontal support 715 is connected to the other end, which is the center of rotation of the rotatable portion 713.

In one example, a receiving space 731 for receiving wash-water having passed through the check valve 71 is provided above the check valve 71 and below a first chamber 732 as described below. The first chamber 732 is configured for collecting the washing-water moved upward from the receiving space 731. A second chamber 733 is configured for collecting the washing water before the washing-water moved from the first chamber 732 is discharged to the outside through the water-discharging hole 79. The first and second chambers are defined between the water receiving hole 77 and the water-discharging hole 79. A first through hole 735 is defined for communicating the accommodation space 731 with the first chamber 732, while a second through hole 737 is defined for communicating the first chamber 732 and the second chamber 733.

The first through-hole 735 is located at a different longitude from that of the slit 712. The second through-hole 737 is located at a different longitude from that of the first through-hole 735. Thus, even though washing-water passes through the open slit 712, the wash water must travel along a bent flow channel 43 to pass through the first through-hole 735. Even though the wash water also flows through the first through-hole 735, the wash water must travel along the bent flow channel 43 again to pass through the second through-hole 737. This bent flow channel acts as a flow resistance against the flowing washing-water.

Therefore, when the auxiliary drum 50 rotates at the washing rpm, the bent flow channel acts as a flow resistance against the washing-water rising along the inner circumferential face of the auxiliary drum 50. Thus, the washing-water may not be discharged to the outside. Further, when the auxiliary drum 50 rotates at a spinning rpm greater than the washing rpm, the washing-water rising along the inner circumferential face of the auxiliary drum 50 may overcome the resistance resulting from the bent flow channel 43 and be discharged to the outside. That is, as the water discharge mechanism 70 has the bent flow channel 43 therein, the water discharge mechanism 70 may selectively discharge the washing-water based on the magnitude of the centrifugal force. In one example, the receiving space 731, first chamber 732, and second chamber 732 may collect lint as removed from the laundry.

Figure 10:
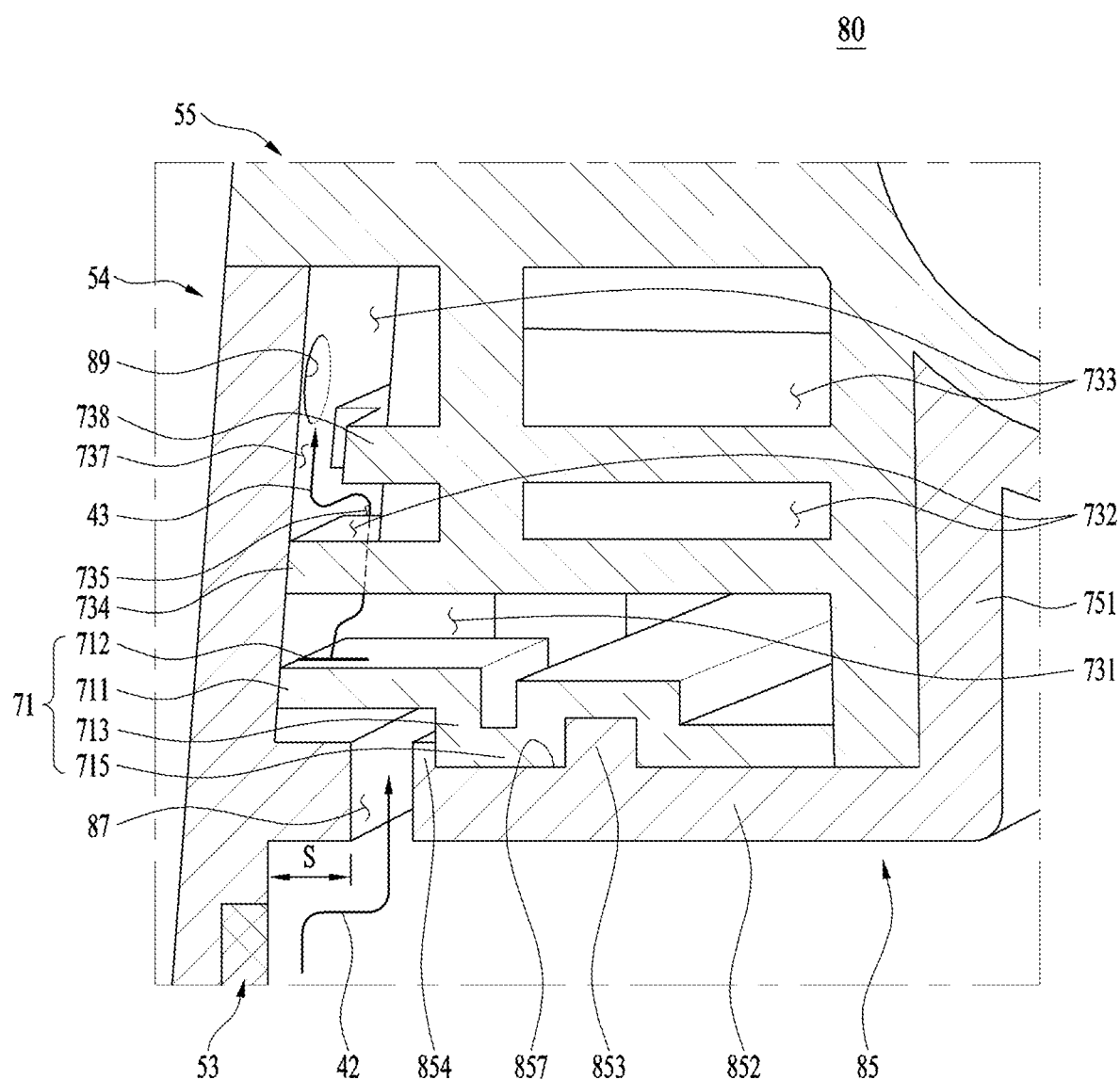
FIG. 10 is an enlarged view of a part D of FIG. 7 to illustrate another example of a water discharge mechanism.

Hereinafter, another example of the water discharge mechanism 80 will be described in detail with reference to FIG. 10. FIG. 10 is an enlarged view of a part D of FIG. 7 to illustrate another example of a water discharge mechanism 80.

Except for a horizontal extension 852 having a water receiving hole 87 defined therein as exemplified below, this example has the same structure as the above example. Therefore, the same reference numeral is assigned to the same component between this example and the above-mentioned example. Detailed description thereof will be omitted.

The seat portion 85 is included in the water discharge mechanism 80 of the auxiliary drum 50 and extends radially inwardly from the side wall of the auxiliary drum 50. The hole 87 is defined in the seat portion 85 so that the water receiving hole 87 receives washing-water inside the auxiliary drum 50. The hole 89 is defined in the side wall of the auxiliary drum 50 so that the washing-water is discharged to the outside of the auxiliary drum 50 therethrough. Accordingly, the water discharge mechanism 80 may selectively allow the washing-water to be introduced into the interior through the water receiving hole 87 or allow the washing-water introduced through the water receiving hole 87 to be discharged to the outside of the auxiliary drum 50 through the water-discharging hole 89, depending on the magnitude of the centrifugal force due to the rotation of the auxiliary drum 50.

In this connection, a water-discharging hole 89 is defined more radially and inwardly of the auxiliary drum 50 than the water receiving hole 87 is defined. The hole 89 is defined at a position higher than a position of the water receiving hole 87. Accordingly, after the washing-water rises through the water receiving hole 87, the wash water may be moved radially and outwardly of the auxiliary drum 50 and then discharged through the water-discharging hole 89. A plurality of water receiving holes 87 may be arranged along the circumferential direction of the auxiliary drum 50. The hole 87 may be formed in a circular hole or slit shape.

The total area of the water receiving hole 87 is smaller than the area of the bottom face of the seat portion 85 where the washing-water collides. Thus, a first resistance is generated when washing-water is introduced into the water receiving hole 87. Furthermore, the water-discharging hole 89 is positioned more radially and outwardly than the water receiving hole 87. Thus, when washing-water flows from the water receiving hole 87 to the water-discharging hole 89, a second resistance is generated. Thus, at a washing RPM lower than the spinning RPM, washing-water is not discharged from the inside of the auxiliary drum 50. Furthermore, washing-water may be selectively discharged only in a predetermined spinning RPM band. This selective discharge may be realized without components to be controlled, such as a drain valve or a drain pump.

In one example, the hole 87 may be formed in the bottom face of the seat portion 85 such that the water receiving hole 87 is spaced by a predetermined distance S radially inwardly from the inner wall of the auxiliary drum 50. The predetermined distance S may be determined by various factors such as the capacity, shape, diameter, depth, etc. of the auxiliary drum 50.

When the auxiliary drum 50 receiving washing-water rotates, a first resistance may occur in which the washing-water moving radially outward due to the centrifugal force overcomes the centrifugal force and moves radially inwards. The total area of the water receiving hole 87 is smaller than the area of the bottom face of the seat portion 85 where washing water collides. Thus, when the washing-water flows into the water receiving hole 87, a second resistance may occur in which a sixth flow 46 is generated. Thereafter, since the water-discharging hole 89 is positioned more radially outwardly than the water receiving hole 87, a third resistance may occur in which a third flow 43 is generated when the water flows from the water receiving hole 87 to the water-discharging hole 89.

In addition, as with the water discharge mechanism 70 according to the above-described example, the water discharge mechanism 80 according to the present embodiment includes first and second chambers 732 and 733, a through-hole 738 defined in the spacer wall between the first and second chambers 732 and 733, and a through-hole 735 defined in the spacer wall defining the first chamber and the receiving space. The through-holes 735 and 738 are defined at different longitudes. Accordingly, the bent flow channel 73 is defined between the water receiving hole 87 and the water-discharging hole 89. Thus, an additional resistance is generated against washing-water passing through the bent flow channel 73. Furthermore, as the water-discharging hole 89 is located at a vertical level higher than the water receiving hole 87, an additional resistance due to gravity may occur when the washing-water rises.

In one example, the water-discharging hole 89 may be formed in a slit shape elongated in the circumferential direction of the auxiliary drum 50. As the water-discharging hole 89 is formed in the shape of the slit, the washing-water rising along the inner wall of the auxiliary drum 50 passes at least once through the water-discharging hole 89, before reaching the top face of the auxiliary drum 50. Accordingly, when the water-discharging hole 89 is formed in the shape of a slit, the washing-water can be more smoothly discharged and less washing-water remains in the water discharge mechanism 80 as compared with a case where the water-discharging hole 89 is formed in a circular shape.

In one example, the auxiliary drum 50 may include a auxiliary drum body 53 receiving washing-water and laundry, and the auxiliary drum cover 51 as described above. The auxiliary drum cover 51 may include a lower cover 54 coupled to the top of the body of the auxiliary drum 50, and an upper cover 55 coupled to the top of the lower cover 54.

The lower cover 54 has a seat portion 85 to seat the upper cover 55 thereon. The seat portion 85 extends radially inwardly from the side wall of the lower cover. The seat portion 85 includes horizontal and vertical extensions. The horizontal extension defines the bottom face of the seat portion 85. The first protrusion 753, the second protrusion 754, and the receiving hole 857 provided in the horizontal extension have the same functions as those of the water discharge mechanism 70 according to the above-described example.

In one example, a first chamber 732 or a second chamber 733 may be defined in the upper cover 55. As the upper cover 55 is coupled to the lower cover 54, the receiving space 731 may be defined. However, the present disclosure is not limited thereto. A receiving space 731 is defined in the lower cover 54. The first chamber 732 is defined as the lower cover 54 and the upper cover 55 are coupled to each other. Alternatively, a receiving space 731 and a first chamber 732 are defined in the lower cover 54. As the lower cover 54 and upper cover 55 join together, a second chamber 733 may be defined.

The water receiving hole 87 receiving washing water in the auxiliary drum 50 is defined in the horizontal extension so that the hole 87 is spaced by a predetermined distance S from the side wall of the lower cover 54. The water-discharging hole 89 is formed in the side wall of the lower cover 54 such that the washing-water is discharged to the outside of the auxiliary drum 50 through the hole 89. Accordingly, the water discharge mechanism 80 may selectively allow the washing-water to flow inwardly through the water receiving hole 87, or allow the washing-water to be discharged through the water-discharging hole 89 to the outside of the auxiliary drum 50, depending on the magnitude of the centrifugal force due to the rotation of the auxiliary drum 50.

Figure 11:
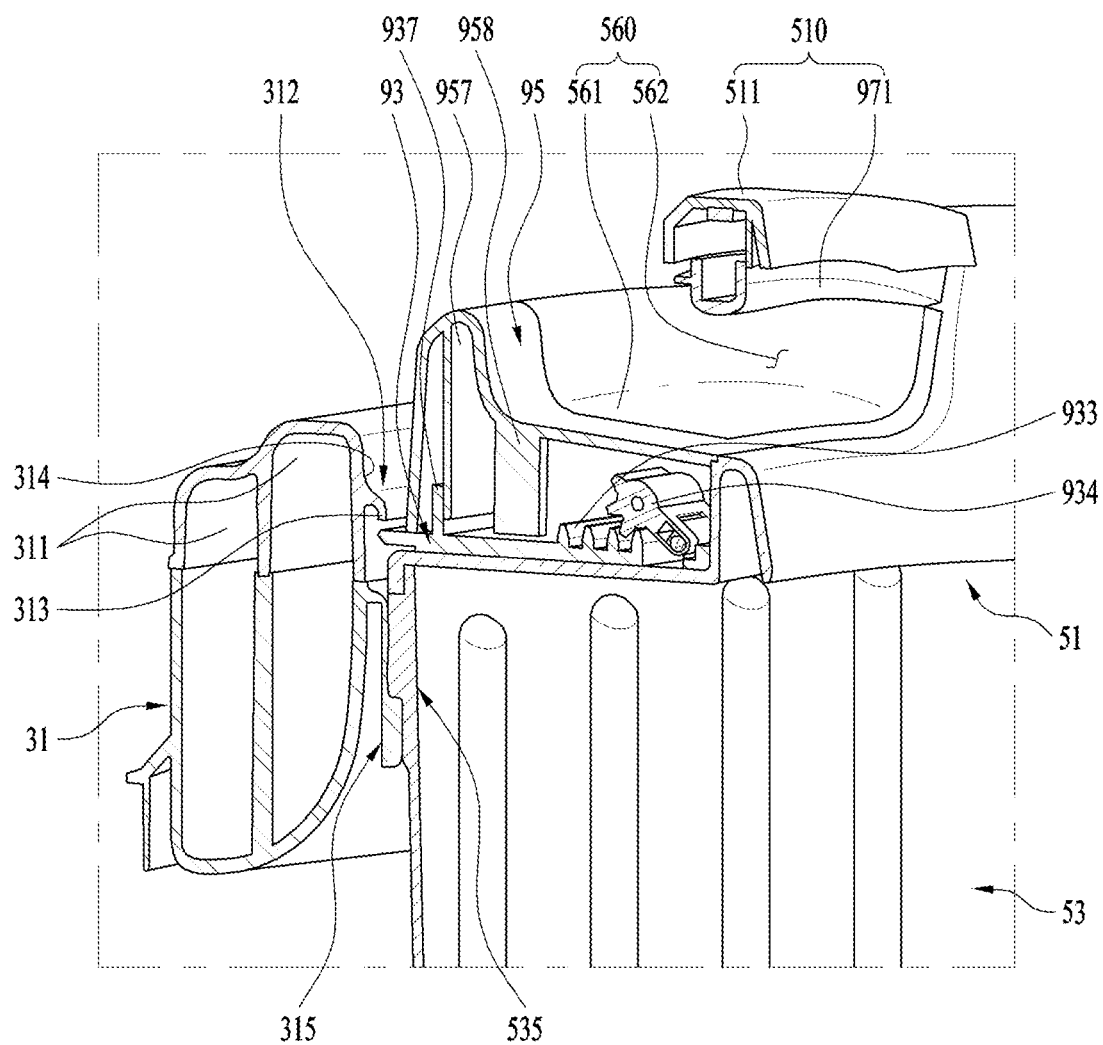
FIG. 11 is a partial cross-sectional view along a line C-C shown in FIG. 4 to illustrate a locking mechanism.
Figure 12:
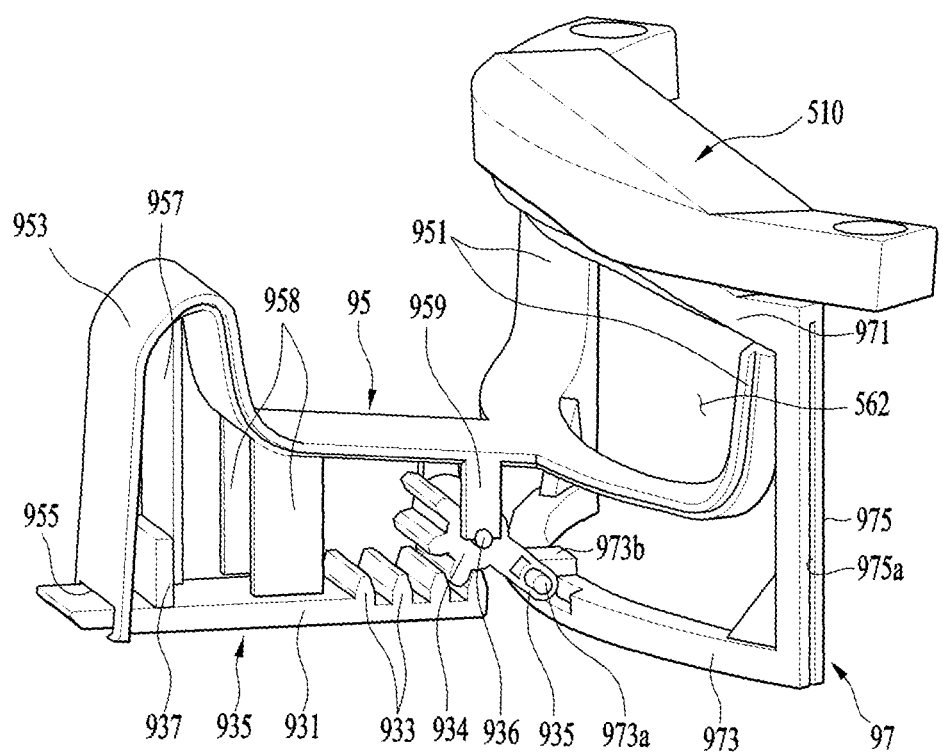
FIG. 12 is a perspective view illustrating the locking mechanism.

Hereinafter, a locking mechanism 90 is illustrated in detail with reference to FIG. 11 and FIG. 12. FIG. 11 is a partial cross-sectional view along a line C-C shown in FIG. 4 to illustrate the locking mechanism 90. FIG. 12 is a perspective view to illustrate the locking mechanism 90.

Referring to FIGS. 11 and 12, the locking mechanism 90 serves to prevent the auxiliary drum from being separated from the main drum when the auxiliary drum 50 is rotated at a high speed after being mounted on the main drum 30.

The locking mechanism 90 includes a stopper 312 protruding from the inner circumferential face of the main drum 30, fixing means 93 coupled to the stopper 312 to limit the vertical movement of the auxiliary drum 50, a first frame 95 provided above the fixing means 93 and a second frame 97 configured to be slidable in the vertical direction.

The stopper 312 protrudes from the inner circumferential face of the main drum 30. The stopper includes a downwardly bent portion 313 extending downwardly to be bent and an upper inclined portion 314 defining the upper portion of the stopper 312 and formed to be inclined downward toward the inner circumferential face of the auxiliary drum 50.

The downwardly bent portion 313 prevents the fixing means 93 from moving upward while a distal end of the downwardly bent portion 313 abuts the top face of the fixing means 93. In addition, the downwardly bent portion 313 may effectively prevent the auxiliary drum 50 from being separated upwards from the main drum 50 even when the stopper 312 is bent upward due to the up-and-down vibration of the auxiliary drum 50.

For example, when the stopper 312 is bent upward in a certain angle range, the distal end of the downwardly bent portion 313 moves toward the auxiliary drum cover 51 while rotating upwardly. Thus, the point of contact between the stopper 312 and the fixing means 93 moves to the inside of the auxiliary drum cover 51 along the top face of the fixing means 93.

If the stopper 312 does not include the downward bent portion 313, the point of contact between the stopper 312 and the fixing means 93 will move out of the auxiliary drum cover 51 along the top face of the fixing means 93 as the stopper 312 is bent upwards, and will then deviate from the fixing means 93 at a certain point in time.

The upper inclined portion 314 is formed at a smaller height than the water-discharging hole 79. The upper inclined portion 314 is formed such that some washing-water falling into the upper inclined portion 314 from the washing-water as discharged from the water-discharging hole 79 rises up along the inclined surface and then is discharged into the tub 20 without being discharged to the main drum 30.

The fixing means 93 is received in the auxiliary drum cover 51 so that a portion thereof may be inserted and withdrawn into and from the auxiliary drum cover. When the fixing means 93 is withdrawn from the auxiliary drum cover 51, a top face thereof is interfered by a bent portion of the stopper 312. Thus, upward movement of the auxiliary drum 50 is restricted.

The fixing means 93 includes a fixing means body 931 formed in a bar shape, a rack 933 formed on a top face of the fixing means body 931 and engaged with a pinion 934, and an upper convex portion 937 formed on the top face of the fixing means body 931.

A tip of the fixing means body 931 is projected to the outside of the auxiliary drum cover 51. The fixing means body 931 is inserted into and withdrawn from the auxiliary drum cover 51 while reciprocating via forward and reverse rotation of the pinion 934 engaged with the rack 933.

The rack 933 is formed on the top face of the distal end of the fixing means body 931. With the rack being engaged with the pinion 934, the rack serves to convert the rotational motion of the pinion 934 into a linear motion.

In one example, the pinion 934 is provided under the first frame 95. The pinion is rotatably connected to the first frame 95 via a first pin 936. The pinion is connected to the second frame 97 via a pinion connector and receives a force from the second frame 97.

The pinion connector includes a first pinion connector 935 formed on one side of the pinion 944 and a second pinion connector 973b coupled to the second frame 97.

The first pinion connector 935 projects radially from the outer circumferential face of the pinion 934. The first pinion connector 935 may be fixed to the outer circumferential face of the pinion 934 and may be made integral with the pinion 934.

The second pinion connector 973b is rotatably connected to the first pinion connector 935 via a second pin. The second pinion connector 973b is connected to the second frame 97 in a reciprocating linear motion manner.

Thus, the pinion 934 rotates in conjunction with the reciprocating linear motion of the second frame 97.

The upper convex portion 937 is interfered by the tension bar 957 of the first frame 95. Thus, the upper convex portion 937 allows the fixing means 93 moved to the outside of the auxiliary drum cover 51 via the rotation of the pinion 934 to be inserted again into the auxiliary drum cover 51.

The first frame 95 is provided above the fixing means 93 and is formed into a bar shape. Furthermore, a top face of the first frame 95 defines a portion of the side face of the recess 561, a portion of the bottom face of the recess, and a portion of the outer face of the auxiliary drum cover 51. Accordingly, the first frame 95 has upwardly bent portions at both ends thereof respectively. In one example, a flange is formed on each of both sides of the first frame 95 such that the first frame is coupled to the auxiliary drum cover 51.

The first frame 95 includes a first bent portion 951 bent at one end, a pair of second bent portions 953 bent upward at the other end, a side hole 955 defined in the first bent portion 951 for receiving the fixing means 93, a tension bar 957 projecting from the bottom face of the first frame 95, a pair of horizontal guides 958 protruding from the bottom face of the first frame 95 and a pinion support that rotatably supports the pinion 934.

A top face of the first bent portion 951 is upwardly bent once to define the bottom and a portion of the side face of the recess 561. In addition, the top face of the first bent portion 951 is bent downwardly again so as to define a portion of a side face of the auxiliary drum cover 51. The downwardly bent first bent portion 951 extends downwardly to the vertical level at which the fixing means 93 is located. In the distal end of the first bent portion 951, a side hole 955 is defined which allows the fixing means 93 to pass therethrough.

The tension bar 957 is disposed in the concave space downwardly of the first bent portion 951 and extends downwardly. The tension bar 957 is made of elastic material. The length of the tension bar 957 is adjusted according to the height of the concave space. Accordingly, the elastic force transmitted to the upper convex portion 937 may also be adjusted.

The horizontal guide 958 extends downwardly from the bottom face of the first frame 95. A distal end of the guide 958 is properly spaced from the fixing means 93. The horizontal guide 958 allows the fixing means 93 to maintain a horizontal state. That is, when the fixing means 93 reciprocates in the longitudinal direction, the horizontal guide 958 prevents one of the sides of the fixing means from tilting.

A pair of pinion supports 959 may be provided. The pinion support supports, in a rotatable manner, the first pin 936, which passes through the center of rotation of the pinion 934.

A pair of second bent portions 953 are provided, whereby the other end of the first frame are formed in a Y-shape. The second bent portion 953 is disposed below the handle portion 510. A distal end of the second bent portion 953 interferes with the bottom of the first curved portion 971 to be described below, thereby limiting the downward movement of the second frame 97 within a certain range. Accordingly, the second bent portion 953 may be referred to as a stopper.

A top face of each of the two second bent portions 953 define a top face and a portion of a bottom face of the recess 561. Furthermore, a pair of second bent portions 953 define a water-supply hole 562 together with the first curved portion 971.

The second frame 97 is formed in a shape of a rectangular frame having a hollow portion defined therein. The second frame is disposed below the handle portion 510. The second frame 97 is coupled to the auxiliary drum cover 51 to be vertically slidable.

The second frame 97 includes a first curved portion 971 that contacts the bottom of the handle portion 510, a pair of vertical portions 975 that support the first curved portion 971, and a second curved portion 973 that supports the pair of vertical portions 975 and is disposed below the first curved portion 971.

The first curved portion 971 is partially inserted into a recess formed in a bottom of the handle portion 510. That is, a middle portion of the first curved portion 971 is partially inserted into a lower recess of the handle portion 510.

Both ends of the first curved portion 971 are supported by the pair of vertical portions 975. A middle portion of the first curved portion 971 is curved toward the outside of the auxiliary drum cover 51.

The vertical portion 975 is disposed below the first curved portion 971. The vertical portion 975 is fixed to both ends of the first curved portion 971. The vertical portion 975 is movably coupled to the auxiliary drum cover 51 so that the second frame 97 can be moved up and down. That is, the vertical portion 975 is coupled to the auxiliary drum cover 51 through a slit groove 975a defined in a direction extending up and down in one side face thereof.

Both ends of the second curved portion 973 are fixed to the pair of vertical portions 975, thereby supporting the pair of vertical portions 975. The second curved portion 973 is curved toward the outside of the auxiliary drum cover 51. The second pinion connector 973b is disposed on the middle of the second curved portion 973.

The second pinion connector 973b is coupled to the second curved portion 973 so as to reciprocate linearly. The second pin 973a is rotatably coupled to one side of the second pinion connector 973b. The second pin 973a is rotatably coupled to one end of the first pinion connector 935.

Thus, when the second curved portion 973 rises up together with the pair of vertical portions 975 without horizontal movement, this may rotate the pinion 934.

In one example, when the user grasps the first curved portion 971 together with the handle portion 510 and exerts an upward force, the entire second frame 97 slides upward to allow the pinion 934 to be rotated. This may allow inserting or withdrawing the fixing means 93 into and out of the drum cover. Thus, the first curved portion 971 may be referred to as an actuating portion 971.

The following will sequentially illustrate an operation of the laundry treating apparatus 1 constructed as described above with reference to the drawings.

First, the user separates the laundry, which is not suitable for washing together, into two groups and puts them in the main drum 30 and the auxiliary drum 50, respectively.

The user then grasps the handle portion 510 of the auxiliary drum 50 and seats the auxiliary drum 50 on the top of the main drum 30 such that the auxiliary drum 50 is engaged with the main drum 30.

The user applies force to the actuating portion 971 when pushing the handle portion and pushes the portion 971 into the handle portion. As a result, the second frame 97 rises up.

The second pinion connector 973b rises up together with the second frame 97. IN this connection, the second pinion connector 973b rises up along a curved path, unlike the second frame 97, which rises up along a straight path. In other words, the second pinion connector 973b moves right and then left while moves up in FIG. 12.

The pinion 934, which is connected to the second pinion connector 973b via the first pinion connector 935, rotates counterclockwise in FIG. 11.

While the fixing means 93 connected to the pinion 934 via the rack 933 move to the right in FIG. 12, the tip of the fixing means 93 is inserted into the auxiliary drum cover 51. Accordingly, the auxiliary drum 50 may descend into the main drum 30 without mutual interference between the fixing means 93 and the stopper 312. When the auxiliary drum 50 descends, the second convex-concave portion 535 seats on the first convex-concave portion 315. This process may allow the auxiliary drum 50 to be seated on the top of the main drum 30.

When the auxiliary drum 50 is seated on the main drum 30, the user releases the force applied to the actuating portion 971. The fixing means 93 moves to the left via the elastic force that the tension bar 957 applies to the upper convex portion 937 in the left direction. As a result, the fixing means 93 is pulled out of the drum cover. As a result, the pinion 934 rotates clockwise in FIG. 12. The pair of vertical portions 975 and pair of the second curved portions 973 are lowered, whereby the actuating portion 971 returns to its original position.

When the auxiliary drum 50 is seated on the top of the main drum 30 and engaged with the main drum 30, the water-supply 18 begins to supply the water to the main drum 30 and the auxiliary drum 50, respectively.

First, the main drum 30 starts rotating. The auxiliary drum 50 receives the rotational force from the main drum 30 via the first convex-concave portion 315 and the second convex-concave portion 535 and rotates together with the main drum 30.

In this connection, the main drum 30 rotates by a predetermined angle so that the inner water-supply guide 560 is positioned below the water-supply 18. When the inner water-supply guide 560 is located below the water-supply 18, the water-supply 18 begins to supply wash-water with detergent dissolved therein. The supplied washing-water temporarily stays in the recess 561 and then is supplied into the auxiliary drum body 53 through the second water-supply channel 562.

When the water-supply to the auxiliary drum body 53 is completed, the main drum 30 is again rotated by a predetermined angle so that the outer water-supply guide 570 is positioned below the water-supply 18. When the outer water-supply guide 570 is positioned below the water-supply 18, the water-supply 18 starts the water-suppling. The supplied washing-water impinges on the outer water-supply guide 570 and is thus fed into the tub 20 along the first water-supply channel 573. The washing water-supplied into the tub 20 is injected into the main drum 30 through the holes 33.

When the water-supply is completed, the main drum 30 begins to rotate in order to perform a washing process, that is, a washing cycle, a rinse cycle and a spinning cycle. The auxiliary drum 50 receives the rotational force from the main drum 30, thereby rotating at the same rotational speed as the main drum 30.

When the auxiliary drum 50 rotates, the washing-water received inside the auxiliary drum 50 rotates along the inner circumferential face of the auxiliary drum body 53. Since the transverse section of the auxiliary drum 50 is formed in an elliptical shape, a vortex is formed in the auxiliary drum. Accordingly, the frictional force between laundry is increased, and, thus, the washing power may increase.

In one example, as a rotational speed of the auxiliary drum 50 increases, washing-water rises slowly as it rotates along the inner circumferential face. Thus, a fifth flow 45 as described below is generated.

The washing-water, which has begun to slowly rise, clashes with the guide rib 531 and rises up rapidly. Then, the washing-water moves along an upper portion of the inner circumferential face of the auxiliary drum body 53 and then moves horizontally along the bottom face of the auxiliary drum cover 51. Thereafter, the washing water encounters the bottom face of the inclined guide 581 and thus is suddenly changed in a direction thereof downwardly. The washing-water whose the direction of movement is suddenly changed downwards collides with the laundry received in the auxiliary drum body 53 at a high speed. This fifth flow of the washing-water raises the washing power.

In one example, the washing-water inside the auxiliary drum 50 rotating at a high speed partially rises up via collision with each other. The elevated wash water then falls onto the inclined guide 581 formed on the laundry inlet 580. Thus, the water is collected by the auxiliary drum 50. In this way, the sixth flow 46 is generated.

Only the larger spacing portion C1 of the auxiliary drum 50, that is, the contact portion C1 thereof is engaged with the main drum 30. Thus, When the auxiliary drum 50 rotates at a high speed while the position of the laundry is biased, the smaller spacing portion C2, that is, the spaced portion C2 oscillates up and down. Thus, the rolling phenomenon may occur. In this connection, the rolling phenomenon may be mitigated by the first and second tilting-preventing portions 319 and 539.

In one example, the angles of the first inclined connection portion 318 and the second inclined connection portion 538 are set to approximately 10 degrees with respect to the gravitational direction. Therefore, even when the main drum 30 rotates at a high speed, the second inclined connection portion 538 rises up along the first inclined connection portion 318. Thus, the auxiliary drum 50 may be not easily removed from the main drum 30.

Even when the main drum 30 rotates at the high speed so that the second inclined connection portion 538 rises up along the first inclined connection portion 318, the top face of the fixing means 93 is pressed downwardly by the bent portion of the stopper 312. Thus, the auxiliary drum 50 is not released from the main drum 30.

When performing the washing process, a normal spinning cycle and a provisional spinning may be carried out. In this connection, the washing-water should be discharged from the auxiliary drum 50 to the outside. Since the main drum and the auxiliary drum receive laundry groups respectively which are sorted based on the type and size thereof, it is not advisable to discharge the washing-water from the auxiliary drum 50 to the main drum 30.

When the auxiliary drum 50 rotates at a high speed for the spinning cycle, the washing-water is discharged to the outside through the water discharge mechanism 70.

Specifically, a first flow 41 is created in which washing-water rises up along the inner circumferential face of the auxiliary drum 50.

Thereafter, the washing-water passes through the water receiving hole 77 and then moves to the check valve 71. In this way, a second flow 42 is generated. The second flow 42 does not pass through the check valve 71 until the auxiliary drum 50 rotates at a high speed.

When the auxiliary drum 50 rotates at a high speed, the check valve 71 opens and thus the washing-water generates a third flow 43.

Thereafter, a fourth flow 44 is generated in which the washing-water is discharged to the outside of the auxiliary drum 50 through the water-discharging hole 79. A portion of the fourth flow 44 rises up along the upper inclined portion 314 and then is discharged into the tub 20.

As described above, the washing-water passes through the open check valve 71 and then is discharged out through the side face of the auxiliary drum 50. At this time, the washing water is discharged upwardly of the main drum cover 31. The discharged washing-water moves over the top of the main drum cover 31 by a centrifugal force and is then injected into the tub 20. he washing-water in the auxiliary drum 50 injected into the tub 20 is not injected into the main drum 30 through the holes 33. Rather, the washing water is discharged to the outside of the tub 20 through the drain pump 11.

In one example, the auxiliary drum 50 may rotates at a washing rpm lower than the spinning rpm, for a wash cycle other than a spinning cycle. In this connection, washing-water in the auxiliary drum 50 should be reserved for the washing cycle. Thus, it is not desirable that the wash water is discharged through the water discharge mechanism 70 to the outside as in the spinning cycle. Thus, taking into account that the rotational speed for the wash cycle is lower than the rotational speed for the spinning cycle, the check valve is configured such that the wash-water cannot easily pass through the check valve 71 at the rotational speed for the washing cycle.

When the washing process is finished, the user may separate the auxiliary drum 50 from the main drum 30 in a reverse order to an order in which the auxiliary drum 50 is seated on the main drum 30 and coupled to the main drum.

Figure 13:
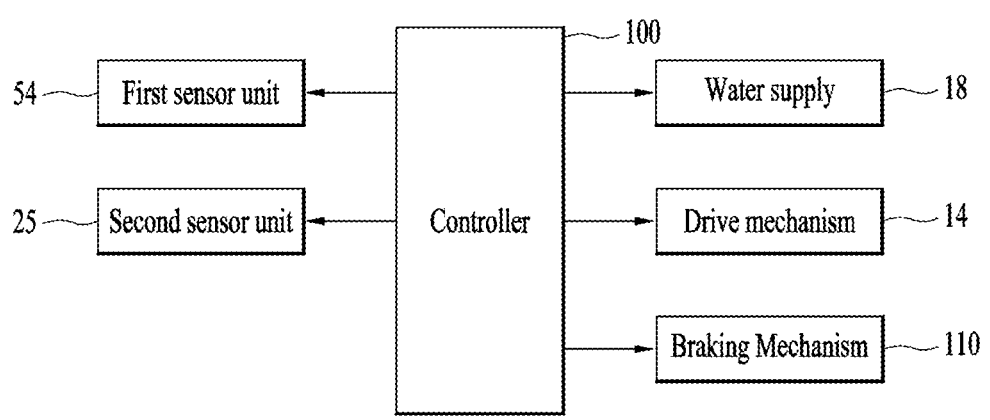
FIG. 13 is a block diagram of the laundry treatment apparatus according to one embodiment of the present disclosure.
Figure 14:
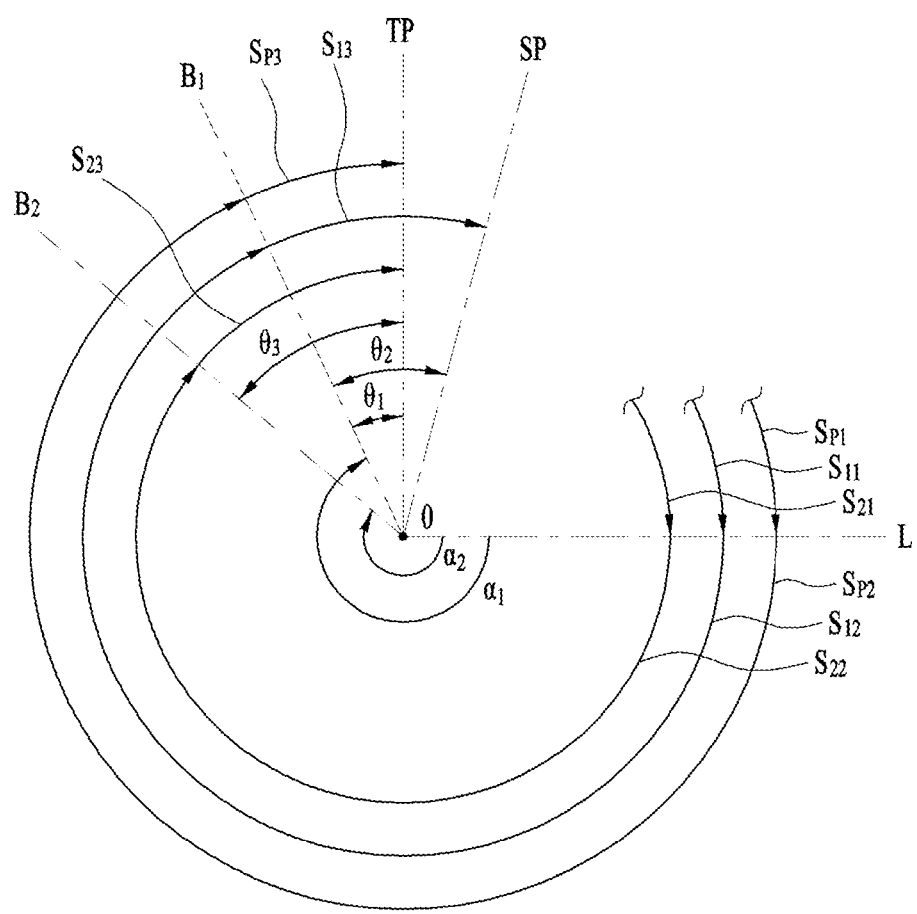
FIG. 14 illustrates a position control of the auxiliary drum of the laundry treatment apparatus according to one embodiment of the present disclosure.

Hereinafter, a method of controlling the auxiliary drum 50, by which the auxiliary drum 50 rotates and stops at a specific point will be described with reference to FIGS. 13 and 14. FIG. 13 is a block diagram showing the configuration of the laundry treatment apparatus 1 according to one embodiment of the present disclosure. FIG. 14 is a diagram showing a rotation path and a rotation angle of a predetermined portion of the auxiliary drum 50 to illustrate a method for controlling the auxiliary drum 50.

Referring to FIG. 13, the laundry treatment apparatus 1 according to one embodiment of the present disclosure includes components for performing the controlling method. These components may include the first sensor unit 54, the second sensor unit 25, the controller 100, the water-supply 18, the drive mechanism 14 and the braking mechanism 110. The controller 100 controls the water-supply 18, the drive mechanism 14, and the braking mechanism 110 via a predetermined determination process based on the sensing signals emitted by the first sensor unit 54 and the second sensor unit 25 or based on the sensing signal generated by the first sensor unit 54 and the output current detected during the current of the constant phase flows in the motor. In this connection, both of the sensing signal generated by the second sensor unit 25 and the output current detected while the current of the constant frequency flows through the motor may be values used for the rotation angle of the main drum 30. In the following, for convenience of illustration, the second sensor unit 25 is exemplarily illustrated as a component sensing the rotation angle of the main drum 30.

In one example, in the method for controlling the auxiliary drum 50, the auxiliary drum 50 is controlled to rotate by a predetermined angle so that the outer water-supply guide 570 or the inner water-supply guide 560 is positioned below the single water-supply 18. Alternatively, the auxiliary drum 50 is controlled to rotate by a predetermined angle such that the handle portion may be located at a certain position to allow the user to conveniently mount or dismount the auxiliary drum 50 to or from the main drum 30. In this manner, in the method of controlling the auxiliary drum 50, the controller 100 may control the drive mechanism 14 and the braking mechanism 110 such that the auxiliary drum 50 is positioned at a specific position.

This controlling method includes a positioning operation that allows a predetermined portion of the auxiliary drum 50 to be positioned at a target position TP via rotation of the auxiliary drum 50.

Hereinafter, the positioning operation will be exemplified with reference to FIG. 14. The positioning operation is performed while the auxiliary drum 50 is accelerated and rotated at the preset rotational speed. This positioning operation may allow the predetermined portion of the auxiliary drum 50 to be stopped at the target position TP.

In this connection, the target position TP means a position at which the auxiliary drum 50 is rotated by a predetermined angle such that the predetermined portion of the auxiliary drum 50 is positioned closest to a preset position outside the auxiliary drum 50.

For example, when the positioning operation is for water-supply purposes, the target position TP may be a position to which the auxiliary drum 50 is rotated such that the inner water-supply guide 560 or the outer water-supply guide 570 is positioned below the water-supply 18.

Further, in another example, when the purpose of the positioning operation is to allow the user to separate or couple the auxiliary drum 50, the target position TP indicates a position to which the auxiliary drum 50 is rotated such that a pair of handle portions 510 of the auxiliary drum 50 are positioned at specific positions on both sides of the washing machine.

In this positioning operation, the slip angles θ1 to θ3 by which the auxiliary drum 50 slips from the braking-initiation positions B1 and B2 where braking of the auxiliary drum 50 is started may vary depending on the weight of laundry or washing-water contained in the auxiliary drum 50. Further, since the auxiliary drum 50 is coupled to the inner circumferential surface of the main drum 30 and receives a rotational force from the main drum 30, the slip angle θ1 to θ3 of the auxiliary drum 50 may be affected by the weight of the laundry and washing-water contained in the main drum 30. That is, when the same braking force is applied, the slip angle θ1 to θ3 of the auxiliary drum 50 may vary depending on the weight of laundry and washing-water contained in the auxiliary drum 50 and the main drum 30.

In one embodiment shown in FIG. 14, the first braking-initiation position B1 is preset considering the slip angle θ1 only due to the self-weight of the auxiliary drum 50 and the main drum 30. The slip angle θ1 only based on the self-weight of the auxiliary drum 50 and the main drum 30 is collected and stored experimentally. When required, the slip angle θ1 may be extracted from stored data and may be used. In an experiment to set the slip angle θ1 in advance, for example, the auxiliary drum 50 and the main drum 30 may be free of the washing-water and laundry therein. Then, the first rotation operation Sp1, the second rotation operation Sp2, and the braking operation Sp3 may be performed in advance. Based on this experiment, the slip angle θ1 may be determined. Then, the first braking-initiation position B1 may be set based on the determined slip angle θ1.

In the positioning operation, the position at which braking of the auxiliary drum 50 is started is set differently from the preset braking-initiation position B1, based on the magnitude of the load applied to the drive mechanism 14. In this connection, the braking of the auxiliary drum 50 means that the braking mechanism 110 applies a braking force to the main drum 30 to stop the rotation of the auxiliary drum 50.

This positioning operation may include the rotation operations S11 and S12 in which the auxiliary drum 50 rotates, a braking operation S13 in which the braking of the auxiliary drum 50 is started after the rotation operations S11 and S12, and, after the braking operation S13a, a correction operation for correcting the braking-initiation position based on the rotation angle difference between the stop position where the predetermined portion is stopped and the target position TP.

The rotation operations S1 and S12 are operations for rotating the auxiliary drum 50 such that the auxiliary drum 50 accelerates to a predetermined rotation speed. The reason why the auxiliary drum 50 is accelerated to the preset rotation speed is as follows: If the rotation speed of the accelerated auxiliary drum 50 is too low, the slip angle θ1 of the auxiliary drum 50 becomes small, so that it is difficult to calculate accurate target angles α1 and α2 to be described later; conversely, if the rotation speed of the auxiliary drum 50 is excessively high, it is also difficult to calculate accurate target angles α1 and α2 due to an excessive slip distance, and the stability of the drive mechanism 14 is problematic.

These rotation operations S11 and S12 may include a first rotation operation S11 in which the auxiliary drum 50 is accelerated to the preset rotation speed, and, after the first rotation operation after S11, a second rotation operation S12 in which the auxiliary drum 50 further rotates by the first target angle α1.

In the first rotation operation S11, a sufficient number of rotations of the auxiliary drum 50 need to be secured such that the auxiliary drum 50 may be accelerated and rotated to the preset rotation speed. Accordingly, the first rotation operation S11 is configured as follows: until the first sensor unit 54 detects the rotation twice, the auxiliary drum 50 rotates; otherwise, if the first sensor unit 54 does not detect the two rotations, the auxiliary drum 50 continues to rotate. In the first rotation operation S11, a last rotation speed of the auxiliary drum 50 is set to 20 rpm. However, the present disclosure is not limited thereto. The last rotation speed of the auxiliary drum 50 may be set to a value within a range of approximately 15 rpm to 25 rpm.

In the above example, in the first rotation operation S11, until the first sensor unit 54 senses a first rotation and then detects a second rotation, the auxiliary drum 50 may be accelerated. However, the present disclosure is not limited thereto. Alternatively, until the first sensor unit 54 senses the rotation once and then the second sensor unit 25 senses 360 degrees, the auxiliary drum 50 may be accelerated. In either case, the auxiliary drum 50 may be rotated and accelerated by at least one rotation.

The second rotation operation S12 is an operation in which the auxiliary drum 50 further rotates by the first target angle α1 after performing the first rotation operation S11. In this connection, the first target angle α1 may refer to an angle by which the predetermined portion of the auxiliary drum 50 is rotated from the completion time of the first rotation operation S11 to the time when the auxiliary drum 50 reaches the first braking-initiation position B1. Further, the completion time of the first rotation operation S11 coincides with a time when the sensing signal from the first sensor unit 54 occurs twice. The second braking-initiation position B2 may refer to a position where the auxiliary drum 50 starts to be braked.

In one example, a rotation angle spaced between the target position TP and the first Hall sensor 55 based on the auxiliary drum 50 may be preset. A rotation angle spaced between the first magnet 56 and the predetermined portion of the auxiliary drum 50 based on the auxiliary drum 50 may be preset.

In this case, when the first sensor unit 54 generates the sensing signal, the rotational position L of the predetermined portion of the auxiliary drum 50 may be constant regardless of the mounting position of the auxiliary drum 50 by the user. Further, the first braking-initiation position B1 at which the braking of the auxiliary drum 50 is started may be set in advance, for example, in consideration of the slip angle α1 due to the own weight of the auxiliary drum 50 or the main drum 30. Therefore, the first target angle α1 may be constant regardless of the mounting position of the auxiliary drum 50 by the user. In other words, every time the user mounts the auxiliary drum 50 on the main drum 30, the auxiliary drum 50 may be slightly rotated and mounted on the main drum. In this case, in the first rotation operation, the total rotation angle at which the auxiliary drum 50 rotates may be varied based on the mounting position of the auxiliary drum 50 by the user. However, once the first rotation operation is complete, the predetermined portion has always reached the L position. Thus, the first target angle α1, which is the total rotation angle at which the auxiliary drum 50 rotates in the second rotation operation may be always constant.

In the second rotation operation S12, the auxiliary drum 50 may not be accelerated. In the first rotation operation S11, the auxiliary drum 50 has been accelerated to the preset rotation speed. Thus, the auxiliary drum 50 may rotate while maintaining the rotation speed achieved at the completion of the first rotation operation S11.

In one example, the angle at which the auxiliary drum 50 rotates in the second rotation operation S12 may be sensed by the second sensor unit 25 or the sensorless manner.

When the auxiliary drum 50 rotates by the first target angle α1 as sensed by the second sensor unit 25 or in a sensorless manner, the second rotation operation S12 ends.

The braking operation S13 may refer to an operation in which, when the predetermined portion reaches the preset first braking-initiation position B1, the braking of the auxiliary drum 50 starts, and in response, the auxiliary drum 50 slips and stops without rotating any more. In this connection, the fact that the auxiliary drum 50 starts to be braked means that the braking mechanism 110 starts to transmit the braking force to the main drum 30 which rotates together with the auxiliary drum 50.

When the braking is started at the first braking-initiation position B1, the auxiliary drum 50 slips by a certain slip angle θ2 and then stops.

When, as described above, the first braking-initiation position B1 is set in advance with taking into account, for example, the slip angle θ1 occurring only by the own weight of the auxiliary drum 50 or the main drum 30, the braking of the auxiliary drum 50 starts at the first braking-initiation position B1 and the drum 50 then stops in a state where the washing water and laundry are not accommodated in the auxiliary drum 50. Thus, the predetermined portion of the drum 50 may be positioned at the target position TP.

However, when the washing water or laundry is received in the auxiliary drum 50 or the main drum 30, the predetermined portion is not positioned at the target position TP but slips from the target position TP by the slip angle θ2 and then stops and is positioned at the stop position SP. Thus, in order for the predetermined portion to be positioned at the target position TP, the first braking-initiation position B1 at which the braking is started needs to be corrected in the correction operation to be described later unless the braking force is increased.

The correction operation may be configured for setting the second braking-initiation position B2 by correcting the first braking-initiation position B1. When, as described above, the first braking-initiation position B1 is preset with considering only the weight of the auxiliary drum 50 or the main drum 30, the first braking-initiation position B1 may be corrected to the second braking-initiation position B2 by further rotating counterclockwise the first braking-initiation position B1 from the target position TP. As shown in FIG. 14, the second braking-initiation position B2 is positioned at a position to which the predetermined portion is rotated by the slip angle θ3 counterclockwise from the target position TP. In this case, the increase in the slip angle θ3 may be equal to the slip angle θ2.

In one example, the positioning operation further includes, after the correction operation, further rotation operations S21 and S22 in which the auxiliary drum 50 is accelerated and rotated to the preset rotation speed, and, after the further rotation operations, a further braking operation S23 in which the braking of the auxiliary drum 50 is started at the second braking-initiation position B2.

The further rotation operations S21 and S22 and the further braking operation S23 may correspond to the rotation operations S11 and S12 and the braking operation S13, respectively. The same principle applies therebetween.

Thus, the further rotation operations S21 and S22 includes a first further rotation operation S21 for rotating the auxiliary drum 50 by the preset rotation counts, and, after the first further rotation operation S21, a second further rotation operation S22 for further rotating the auxiliary drum 50 by the second target angle α2. In this connection, the second target angle α2 is the angle by which the predetermined portion has rotated, after the completion of the first further rotation operation S21, for a duration from the completion time of the first further rotation operation S21 to the time when the predetermined portion reaches the second braking-initiation position B2.

In the further braking operation S23, when the braking of the rotating auxiliary drum 50 is started at the second braking-initiation position B2, a braking force of the same magnitude as that of the braking force in the braking operation S13 is applied. In response, the auxiliary drum 50 slips by the slip angle θ3 and then stops at the target position TP.

In one example, the positioning operation may be used to control the rotation angle of the auxiliary drum 50 such that water is supplied from the single water-supply 18 to the auxiliary drum 50 or the main drum 30, respectively.

That is, the positioning operation rotates the auxiliary drum 50 so that the outer water-supply guide 570 is positioned below the water-supply 18. Alternatively, the positioning operation may allow the auxiliary drum 50 to rotate so that the inner water-supply guide 560 is positioned below the water-supply 18. That is, the positioning operation may be performed to rotate the auxiliary drum 50 by a predetermined rotation angle.

In this connection, the predetermined portion may be the outer water-supply guide 570 or the inner water-supply guide 560. The target position TP includes the position at which the outer water-supply guide 570 is positioned below the water-supply 18 or the position at which the inner water-supply guide 560 is positioned below the water-supply 18. The target position TP may be referred to as a water-supply position, as described below. Further, the first target angle α1 may be a rotation angle of the outer water-supply guide 570 or the inner water-supply guide 560 from the position L at the time of detection of the rotation count by the first sensor unit 54 to the first braking-initiation position B1.

In one example, after performing the positioning operation, a water-supply initiation operation may be performed that opens the water-supply hole and supplies washing-water. In the water-supply initiation operation, the washing-water is discharged from the water-supply 18 and then flows into the main drum 30 through the outer water-supply guide 570 or is introduced into the auxiliary drum 50 through the inner water-supply guide 560.

Further, before the positioning operation, a mounting detection operation of the auxiliary drum 50 may be performed to detect whether the auxiliary drum 50 is mounted in the main drum. When it is determined that the auxiliary drum 50 is mounted on the main drum 50 in the mounting detection operation of the auxiliary drum 50, the positioning operation is performed.

A detailed example of the water-supply initiation operation and the mounting detection operation of the auxiliary drum 50 will be described later.

Hereinafter, a method of controlling the water-supply to individually supply water to the main drum 30 and the auxiliary drum 50 is illustrated with reference to FIGS. 15 to 17.

Figure 15:
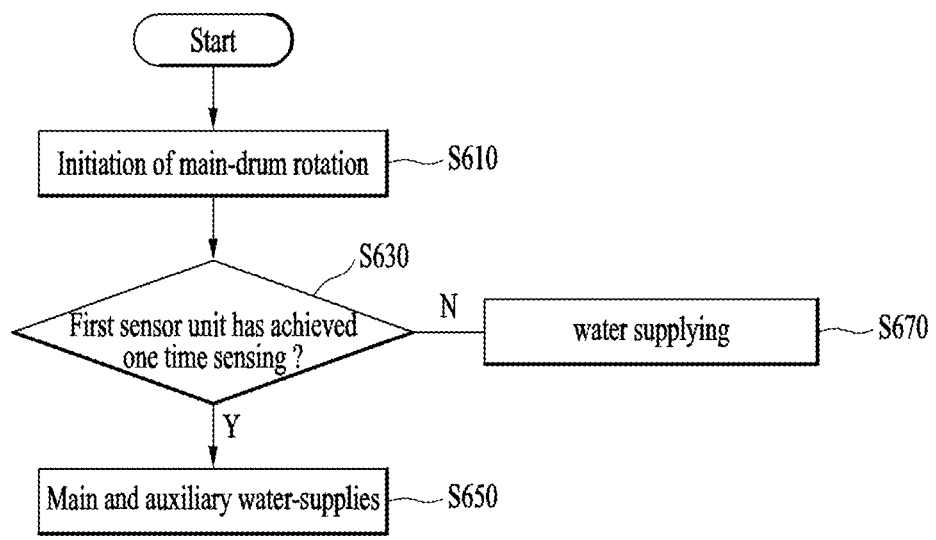
FIG. 15 is a flow chart illustrating an operation of determining whether the auxiliary drum is mounted on the main drum.

FIG. 15 is a flowchart illustrating an operation for determining whether the auxiliary drum is mounted on the main drum. FIG. 16 is a flow chart illustrating a main water-supply operation. FIG. 17 is a flow chart illustrating an auxiliary water-supply operation.

In a method for controlling the water-supply of the laundry treatment apparatus according to one embodiment of the present disclosure, the controller 100 controls the laundry treatment apparatus to continuously rotate the main drum 30 by a predetermined angle such that the washing water discharged from the single water-supply 18 is sequentially supplied through water-supply guides disposed at different positions on the upper face of the auxiliary drum 50 into the tub 20 or the auxiliary drum 50.

Figure 16:
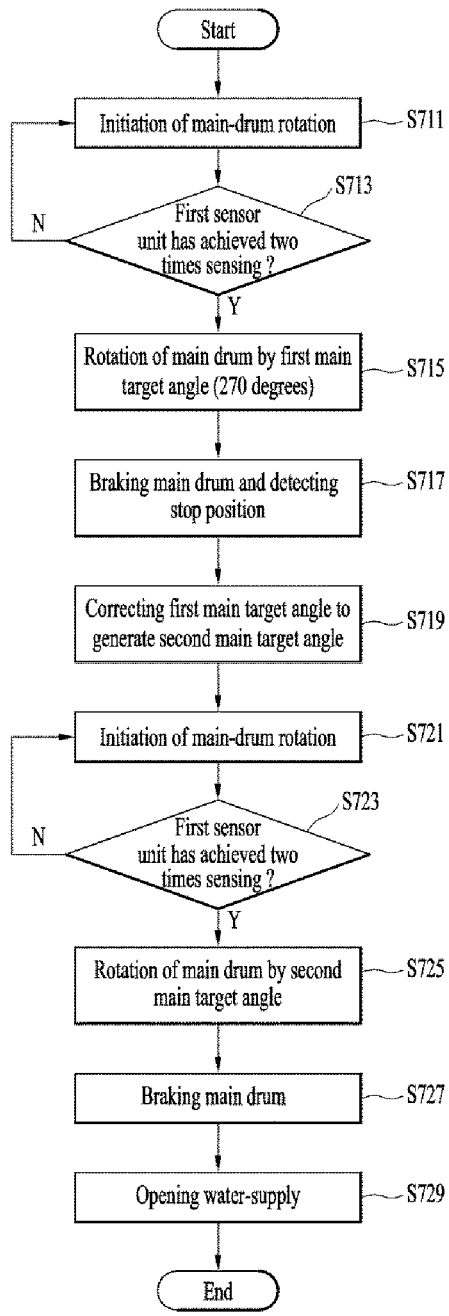
FIG. 16 is a flow chart illustrating a main water-supply operation.
Figure 17:
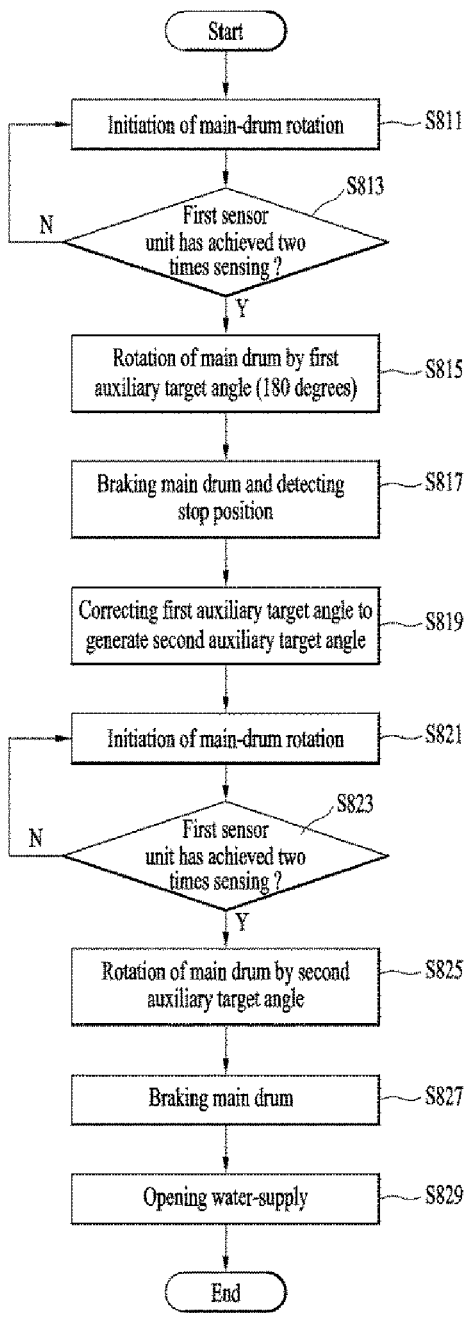
FIG. 17 is a flow chart illustrating an auxiliary water-supply operation.

Referring to FIGS. 15 to 17, the method for controlling the water-supply of the laundry treatment apparatus according to one embodiment of the present disclosure includes the auxiliary drum mounting detection operation, the rotation operation, the braking operation, the correction operation, the further rotation operation, the further braking operation, and the water-supply initiation operation. In this connection, the rotation operation, the braking operation, the correction operation, the further rotation operation, and the further braking operation are included in the positioning operation as described above.

The operations after the auxiliary drum mounting detection operation may be classified into the main water-supply operation and the auxiliary water-supply operation. The main water-supply operation and the auxiliary water-supply operation are performed substantially in the same manner by the controller 100 except that the target angles according to the positions of the outer water-supply guide 570 and the inner water-supply guide 560 are different from each other between the main water-supply operation and the auxiliary water-supply operation.

The main water-supply operation may be configured for performing the water-supply while positioning the outer water-supply guide 570 at a main water-supply position, which is one of the target positions as described above. In other words, the controller 100 controls the drive mechanism 14 and the braking mechanism 110 to rotate the main drum 30 such that the outer water-supply guide 570 is positioned below the single water-supply 18 fixed to the cabinet 10. In this connection, the main water-supply position may refer to a position of the outer water-supply guide 570 set such that washing-water discharged from the water-supply 18 is supplied to the tub 20 via the outer water-supply guide 570. For example, the main water-supply position may refer to a position below the single water-supply 18.

The auxiliary water-supply operation may be configured for performing the water-supply while positioning the inner water-supply guide 560 at an auxiliary water-supply position, which is one of the target positions as described above. In other words, the controller 100 controls the drive mechanism 14 and the braking mechanism 110 to rotate the main drum 30 such that the inner water-supply guide 560 is positioned below the single water-supply 18 fixed to the cabinet 10. In this connection, the auxiliary water-supply position may refer to a position of the inner water-supply guide 560 set such that washing-water discharged from the water-supply 18 is supplied to the auxiliary drum 50 via the inner water-supply guide 560. For example, the auxiliary water-supply position may refer to a position below the single water-supply 18 as in the main water-supply position. Further, in order that a state in which the outer water-supply guide 570 is positioned at the main water-supply position switches to a state in which the inner water-supply guide 560 is positioned at the auxiliary water-supply position, the main drum 30 should be rotated by a predetermined angle.

Referring again to FIGS. 3 and 4, the outer water-supply guide 570 includes a pair of outer water-supply guides 570 respectively formed at opposing positions. The inner water-supply guide 560 also includes a pair of inner water-supply guides 560 respectively formed at opposed positions. Thus, the controller 100 controls the drive mechanism 14 and the braking mechanism 110 such that the rotation angles of the main drum 30 are set differently between the main water supply operation and the auxiliary water-supply operation. The auxiliary water-supply position may be reached when the main drum 30 is rotated by a predetermined angle from the main water-supply position. In one example, the outer water-supply guide 570 and the inner water-supply guide 560 may be alternately and spacedly arranged at an interval of about 90 degrees. Thus, the auxiliary water-supply position may be reached when the main drum 30 rotates about 90 degrees from the main water-supply position.

Hereinafter, the auxiliary drum mounting detection operation will be described in detail with reference to FIG. 15. In the auxiliary drum mounting detection operation, the controller 100 determines whether the auxiliary drum 50 is mounted in the main drum 30. Then, based on the determination result, the controller 100 determines whether to perform only the main water-supply operation or to perform the main water-supply operation and the auxiliary water-supply operation sequentially. In this way, When the user intends to perform the washing by the auxiliary drum 50 separately from the main drum 30, the user may mount the auxiliary drum 50 on the main drum 30. Alternatively, the user may use the laundry treatment apparatus without mounting the auxiliary drum 50.

Specifically, in the auxiliary drum mounting detection operation, the controller 100 controls the drive mechanism 14 so that the main drum 30 rotates at S610. When the main drum 30 rotates, the second sensor unit 25 senses the rotation angle of the main drum 30 and sends the sensed signal to the controller 100.

In one example, when the second sensor unit 25 senses that the rotation angle of the main drum 30 is 360 degrees, no sensing signal is received from the first sensor unit 54. In this case, the controller 100 determines that the auxiliary drum 50 is not mounted on the main drum 30 at S630-N.

When the auxiliary drum 50 is determined not to be mounted on the main drum 30, the controller 100 performs water-supply at S670.

Conversely, when the second sensor unit 25 detects that the rotation angle of the main drum 30 is 360 degrees, the sensed signal is received from the first sensor unit 54. In this case, the controller 100 determines that the auxiliary drum 50 is mounted on the main drum 30 at S630-Y.

When it is determined that the auxiliary drum 50 is mounted on the main drum 30, the controller 100 performs the main water supply operation and the auxiliary water-supply operation at S650. At the same time, the controller 100 performs the positioning operation together.

The example in which the main water supply operation is performed when the auxiliary drum 50 is not mounted on the main drum 30 was described above. The present disclosure is not limited thereto. The main water-supply operation may be performed depending on the user's selection regardless of whether the auxiliary drum 50 is mounted.

In all of terms of all operations used below, the term "main" or "auxiliary" are used as a first word thereof. In this regard, each of the following operations may be included in either the main water-supply operation and the auxiliary water-supply operation, based on the corresponding first word. However, the main water supply operation and the auxiliary water supply operation are similar to each other in an operation principle. Thus, even when the term "main" or "auxiliary" is excluded from each operation, the feature of the method for controlling the water supply of the laundry treatment apparatus according to one embodiment of the present disclosure may be derived.

Referring to FIG. 16, the main water-supply operation will be described in detail. Referring to FIG. 16, the main water supply operation includes main rotation operations s711, s713, s715, a main braking operation s717, a main correction operation s719, main further rotation operations s721, s723 and s725, a main further braking operation s727, and a main water-supply initiation operation s729.

The main rotation operations s711, s713, and s715 include an operation S711 in which the rotation of the main drum 30 is initiated, a first main rotation operation s713, and a second main rotation operation s715.

In operation s711 in which rotation of the main drum 30 is initiated, the controller 100 controls the drive mechanism 14 to accelerate the main drum 30. This operation is configured to prepare for the first main rotation operation s713.

In the first main rotation operation S713, the main drum 30 is accelerated and rotated until the first sensor unit 54 has achieved two times sensings. Specifically, the controller 100 continues to accelerate the main drum 30 until the first Hall sensor 54 senses the first magnet 56 twice and the controller 100 receives the sensing signal twice.

For the calculation of the correct second main target angle to be described later, in the first main rotation operation S713, the main drum 30 needs to be accelerated to a certain rotation speed. Specifically, in the first main rotation operation S713, when the controller 100 determines, based on one time sensing by the first sensor unit 54, that the auxiliary drum 50 is mounted, the controller 100 controls the drive mechanism 14 so that the main drum 30 continues to rotate without stopping. Thereafter, the controller 100 controls the drive mechanism 14 such that the main drum 30 is continuously rotated and accelerated until the first sensor unit 54 has achieved two times sensings. To this end, the time and rotation counts required to accelerate the main drum 30 may be secured.

If the certain rotation speed of the accelerated main drum 30 is too low, the slip angle of the main drum 30 becomes smaller such that it is difficult to calculate an accurate second main target angle to be described later. Conversely, if the rotation speed of the main drum 30 is excessively high, it is difficult to calculate the second target angle accurately, due to the excessive slip of the main drum and further, the stability of the rive mechanism 14 is problematic. Accordingly, in the first main rotation operation S713, a last rotation speed of the main drum 30 is set to a range of approximately 15 rpm to 25 rpm, and particularly preferably to 20 rpm.

In the first main rotation operation in s713, if the first sensor unit 54 has not achieved two times sensings, the controller continues to accelerate and rotate the main drum 30, at s713-N. If the first sensor unit 54 has performed two times sensings, the controller performs the second main rotation operation s713-Y.

The configuration of the first main rotation operation S713 is described above in which the controller accelerates the main drum 30 until the first sensor unit 54 has achieved two times sensings after one time sensing. However, the present disclosure is not limited thereto. Alternatively, the controller may accelerate the main drum 30 until the first sensor unit 54 has achieved one time sensing and then the second sensor unit 25 senses a 360 degree rotation of the main drum 30.

The second main rotation operation s715 is configured such that the main drum 30 is further rotated by the first main target angle after completion of the first rotation operation such that the main drum 30 is positioned at the main water-supply position.

The first main target angle refers to a rotation angle by which the main drum 30 rotates from a time when the first sensor unit 54 has achieved two times sensings to a time when the predetermined portion or the guide 570 is positioned at the main water-supply position. The first main target angle is determined by an arrangement relationship between the first sensor unit 54 and the outer water-supply guide 570 of the auxiliary drum 50. Whether or not the main drum 30 has rotated by the first main target angle is detected by the second sensor unit 25.

In this embodiment, when the first sensor unit 54 transmits the sensing signal, one of the inner water-supply guides 560 is positioned under the water-supply 18, that is, coincides with the water-supply 18 (0 degree positional phase difference therebetween) while the other thereof is positioned opposite to the water-supply 18 (180 degree positional phase difference therebetween). Further, the first sensor unit 54 transmits the sensing signal, one of the outer water-supply guides 570 has a 90 degree positional phase difference from the water-supply 18) while the other thereof has a 270 degree positional phase difference from the water-supply 18). To this end, the spacing between the first magnet 56 and the inner water-supply guide 560 and the spacing between the first magnet 56 and the outer water-supply guide 570 are preset.

In one example, the spacing between the first magnet 56 and the inner water-supply guide 560 and the spacing between the first magnet 56 and the outer water-supply guide 570 may be set to have various values. Accordingly, when the first sensor unit 54 transmits a sensing signal, one of the inner water-supply guides 560 may be positioned below the water-supply 18 or at a position rotated from the water-supply 18 by a predetermined angle. In this case, the first main target angle and the first auxiliary target angle, which will be described later, may also be set to correspond to this positioning.

When the first sensor unit 54 transmits the sensing signal, the second main rotation operation s715 is configured such that the second sensor unit 25 starts sensing the rotation angle of the main drum 30. When the main drum 30 rotates by 90 degrees or 270 degrees, the second sensor unit transmits a detection signal to the controller 100. When the controller 100 receives the sensing signal, the controller controls the braking mechanism 110 so that the main drum 30 no longer rotates. Accordingly, the outer water-supply guide 570 may be positioned below the water-supply 18. In one example, the spacing between the first magnet 56 and the outer water-supply guide 570 is constant. Thus, if the user does not position the auxiliary drum 50 at the preset position, for example, the drum 50 is further rotated clockwise or counterclockwise from the preset position, the first main target angle does not change depending on whether the auxiliary drum 50 is erroneously mounted on the main drum 30, and, further, the second auxiliary target angle, which will be described later, also does not change depending on whether the auxiliary drum 50 is erroneously mounted on the main drum 30.

In the correction operation as described below, in order to accurately calculate the second main target angle, when the first sensor unit 54 transmits a second sensing signal, the rotational speed of the main drum 30 should reach a range of 15 rpm to 25 rpm, especially 20 rpm. However, this may not be the case always. This is due to the following situation: since the weight of the laundry contained in the main drum 30 and the auxiliary drum 50 changes or the position at which the user first mounts the auxiliary drum 50 first is incorrect, the rotation angle of the main drum 30 may vary until the first sensor unit 54 has achieved one time sensing such that the main drum 30 may not rotate sufficiently.

Therefore, the first main target angle may be set to 270 degrees so that the main drum 30 may rotate more. However, this disclosure is not limited thereto. The first main target angle may be set to 90 degrees.

In the main braking operation S717, the controller 100 controls the braking mechanism 110 such that the braking of the main drum 30 is initiated at the braking-initiation position after completion of the second main rotation operation s715.

In this connection, the braking-initiation position refers to a position to which the main drum 30 is further rotated by the first main target angle after completion of the first main rotation operation S713. Specifically, the braking-initiation position refers to a position to which the main drum 30 is further rotated by the first main target angle after the first sensor unit 54 has achieved two times sensings. The braking-initiation position is the same as the main water-supply position.

When the main drum 30 is braked in a state where laundry is not accommodated in the main drum 30 and the auxiliary drum 50, the braking mechanism 110 applies a braking force to the main drum 30 so that the outer water-supply guide 570 is positioned below the water-supply 18. However, the laundry may be contained in each of the main drum 30 and the auxiliary drum 50. In this case, when the braking mechanism 110 applies the same braking force to the main drum 30, the main drum 30 may slip by the weight of laundry. As a result, the main drum 30 further rotates from the main water supply position. Thus, it may become difficult to perform the main water supply operation. In this case, a method may be adopted in which the controller 100 controls the braking mechanism 110 so that the braking force of the braking mechanism 110 changes to solve the problem. However, in this case, the number of components as required increases. Further, there is a problem in that the operation of the method is relatively complicated because various braking forces must be generated based on the weight of laundry. Therefore, in accordance with the present disclosure, a method of correcting the braking-initiation position to be described later, that is, a method of correcting the first main target angle may be adopted.

In the main correction operation S719, the controller 100 compares the stop position at which the main drum 30 stops after completion of the braking operation with the braking-initiation position. The controller generates a corrected braking-initiation position based on the comparison result.

The stop position refers to a position where the main drum 30 is stopped after slipping by a certain angle from the braking-initiation position. When the main drum 30 slips, the main drum cannot be positioned at the main water-supply position. Thus, the controller may correct the braking-initiation position and thus initiate the braking in advance based on the corrected position. In this connection, correcting the braking-initiation position means correcting the first main target angle and thus setting the second target angle.

When the main drum 30 rotates beyond the first main target angle, the controller may subtract a rotation angle corresponding to an excess amount from the first main target angle to yield the second main target angle. For example, when the main drum 30 rotates by 300 degrees, the controller may subtract the excess amount of 30 degrees from the first main target angle of 270 degrees. This may yield a second main target angle of 240 degrees.

The main further rotation operations s721, s723, and s725 refer to operations in which the main drum 30 is accelerated to rotate to the preset rotation speed after completion of the main correction operation s719. The main further rotation operations s721, s723, and s725 include an operation s721 in which rotation of the drum is initiated, a first main further rotation operation s723 and a second main further rotation operation s725.

In the first main further rotation operation s723, the controller rotates the main drum 30 by the preset rotation counts. In the first main further rotation operation from s723, when the first sensor unit 54 has achieved two times sensings, the controller performs the second main further rotation operation s725 at s723-Y. When the first sensor unit 54 has not achieved two times sensings, the controller continuously accelerates and rotates the main drum 30 at s723-N. The first main rotation operation s713 is the same as the above-described corresponding operation in terms of a controlling manner. Thus, redundant descriptions between them is omitted.

In the second main further rotation operation s725, the controller further rotates the main drum 30 by the second main target angle after completion of the first main further rotation operation s723. In the second main in further rotation operation s725, the controller 100 controls the braking mechanism 110 such that the main drum 30 is rotated by the second main target angle as calculated by correcting the first main target angle. As described above, the second main target angle is defined as a rotation angle calculated with reflecting the slip rotation angle by which the main drum 30 slips due to the weight of laundry stored in the main drum 30 and the auxiliary drum 50.

In the main further braking operation S727, braking of the main drum 30 is initiated at the corrected braking-initiation position after completion of the main further rotation operations s721, s723, and s725.

The corrected braking-initiation position refers to a position at which braking of the main drum 30 is initiated after the main drum 30 rotates by the second main target angle after two times sensings by the first sensor unit 54, as described above. Thus, when the controller controls the braking mechanism 110 such that the braking of the main drum is started after the main drum 30 is rotated by the second main target angle after the controller 100 receives the sensing signal from the first sensor unit 54 two times, the outer water-supply guide 570 is positioned below the water-supply 18.

In the main water-supply initiation operation s729, the controller opens the water-supply 18 and drops the washing-water after completion of the main further braking operation s727. The falling washing water drops to the main drum 30 through the outer water-supply guide 570 formed in the top face of the auxiliary drum 50. The washing water dropped onto the main drum 30 is received in the tub 20 through the through-holes of the main drum 30.

In one example, in the controlling method according to one embodiment of the present disclosure, the configuration in which the auxiliary drum 50 is rotated to approximately 15 to 25 RPM and then braked is illustrated. The present disclosure is not necessarily limited thereto. Alternatively, the auxiliary drum 50 may be slowly rotated at a very low RPM and then braked at a braking-initiation position. In this regard, the RPM of the auxiliary drum 50 may be set to a range of approximately 0 RPM to 5 RPM, and, specifically, may be set to 3 RPM.

The auxiliary drum 50 may be rotated at a rotation speed in the range of approximately 0 RPM to 5 RPM and then may be braked. In this case, the auxiliary drum 50 slips within a predetermined range from the braking-initiation position. However, the slip rotation angle of the auxiliary drum 50 caused by this slip is negligibly small. Therefore, separate operations such as the main correction operation s719, the main further rotation operations s721, s723, and s725, and the main further braking operation s727 are not required.

Hereinafter, the auxiliary water-supply operation will be described in detail with reference to FIG. 17. Referring to FIG. 17, the auxiliary water-supply operation includes auxiliary rotation operations s811, s813 and s815, an auxiliary braking operation s817, an auxiliary correction operation s819, auxiliary further rotation operations s821, s823 and s825, an auxiliary further braking operation s827, and an auxiliary water-supply initiation operation s829.

The auxiliary drum mounting detection operation of the auxiliary water-supply operation is performed when the controller 100 receives the sensing signal detected by the first sensor unit 54 at a first time. Since, as described above, it depends on the user's choice whether or not the auxiliary drum 50 is mounted on the main drum 30, it should be determined whether or not the auxiliary drum 50 is mounted in order to perform the auxiliary water-supply operation.

Hereinafter, the description of the overlapping portions between the main water supply operation and the auxiliary water supply operation is omitted, and the difference between them is described in detail.

The auxiliary rotation operations s811, s813, and s815 include an operation S811 for initiating the rotation of the main drum 30, the first auxiliary rotation operation s813 and the second auxiliary rotation operation s815.

The first auxiliary rotation operation s813 is identical to the first main rotation operation s713. In the first auxiliary rotation operation s813, the controller 100 controls the drive mechanism 14 so that the main drum 30 is accelerated and rotated until the controller 100 receives the sensing signal transmitted by the first sensor unit 54 at the second time. In the first auxiliary rotation operation in s813, the main drum 30 may be accelerated to reach the rotation speed of a range of 15 rpm to 25 rpm, more specifically to 20 rpm.

In the first auxiliary rotation operation in s813, when the first sensor unit 54 has achieved two times sensings, the controller performs the second auxiliary rotation operation s815 at s813-Y. When the first sensor unit 54 has not achieved the two times sensings, the controller continues to rotate the main drum S813-N.

In the second auxiliary rotation operation s815, the main drum 30 is rotated further by the first auxiliary target angle after the completion of the first auxiliary rotation operation s813. As a result, the main drum 30 is positioned at the auxiliary water-supply position. In the second auxiliary rotation operation in s815, the first auxiliary target angle is set to approximately 180 degrees, unlike the first auxiliary target angle of the second main rotation operation s715. This may be because of followings: while the inner water-supply guide is positioned below the water-supply 18 by the rotation of the main drum 30 when the first sensor unit 54 has achieved the two-times sensings, the rotation speed of the main drum 30 may not reach 20 rpm in the first auxiliary rotation operation s813. Thus, at the second auxiliary rotation operation, the controller 100 controls the drive mechanism 14 such that the main drum 30 may be further rotated 180 degrees after the first sensor unit 54 has achieved the two times sensings. In this way, the rotation speed of the main drum 30 reaches 20 rpm The auxiliary braking operation s817 is performed in the same principle as the main braking operation s717, and a description thereof will be omitted.

In the auxiliary correction operation s819, the controller compares the braking-initiation position and the stop position after completion of the auxiliary braking operation s817. The controller corrects the braking-initiation position based on the comparison result. In other words, the controller corrects the first auxiliary target angle to create a second auxiliary target angle. The principle in which the auxiliary correction operation s819 is performed is the same as the principle in which the main correction operation s719 is performed, and detailed description thereof will be omitted.

The auxiliary further rotation operations s821, s823 and s825 include the first auxiliary further rotation operation s823 and the second auxiliary further rotation operation s825.

The first auxiliary further rotation operation s823 is identical to the first main further rotation operation s723. In the first auxiliary further rotation operation s823, the controller 100 controls the drive mechanism 14 so that the main drum 30 rotates until the first sensor unit 54 has achieved two times sensings. In the first auxiliary further rotation operation in s823, when the first sensor unit 54 has achieved the two times sensings, the controller performs the second auxiliary further rotation operation s825 and s823-Y. When the first sensor unit 54 does not achieve two times sensings, the controller continues to accelerate and rotate the main drum s823-N.

In the second auxiliary further rotation operation s825, the controller 100 controls the drive mechanism 14 such that the main drum 30 rotates further by the second auxiliary target angle after completion of the first auxiliary further rotation operation s823. The second auxiliary target angle is set to 180 degrees as described above.

The auxiliary further braking operation s827 is configured such that the main drum 30 is rotated further by the second auxiliary target and then braked. Thus, the inner water-supply guide 560 is positioned below the water-supply 18.

The auxiliary water-supply initiation operation s829 is configured such that, after the auxiliary further braking operation s827 is performed, the water-supply 18 is opened and thus washing water falls to the inner water-supply guide 560 of the auxiliary drum 50. The washing water dropped on the inner water-supply guide 560 is supplied into the auxiliary drum 50.

Although the present disclosure has been illustrated by reference to the specific embodiments and drawings, the present disclosure is not limited thereto. It will be apparent to those skilled in the art that the present disclosure is susceptible to various modifications and alternative constructions within the spirit and scope of the present disclosure and equivalents of the appended claims.

What is claimed is:

1. A method for controlling a laundry treating apparatus, wherein the apparatus includes:
   a tub for receiving washing-water therein;
   a main drum rotatably disposed within the tub;
   a drive mechanism configured to drive the main drum; and
   an auxiliary drum disposed in the main drum so as to be attachable or detachable to or from an inner circumferential face of the main drum, wherein (i) a rotation of the auxiliary drum is dependent on a rotation of the main drum and (ii) washing of a laundry by the auxiliary drum is performed separately from washing of a laundry by the main drum,
   wherein the method comprises performing a positioning operation for allowing a predetermined portion of the auxiliary drum to be positioned at a target position via a rotation of the main drum,
   wherein the positioning operation comprises initiating, based on the predetermined portion reaching a first braking-initiation position such that the predetermined portion is positioned at the target position, a braking of the main drum,
   wherein the method further comprises varying the first braking-initiation position based on a magnitude of a load applied to the drive mechanism.

2. The method of claim 1, wherein the positioning operation includes:
   a rotation operation in which the auxiliary drum is accelerated to a preset rotation speed;
   the braking of the main drum is initiated based on the predetermined portion reaching the first braking-initiation position after the rotation operation; and
   a correction operation in which based on the auxiliary drum stopping via the braking of the main drum, the first braking-initiation position is corrected based on a rotation angle difference between the target position and a stop position at which the predetermined portion stops, thereby generating a second braking-initiation position.

3. The method of claim 2, wherein the preset rotation speed is about 20 rpm.

4. The method of claim 2, wherein the positioning operation further includes:
   a further rotation operation in which the auxiliary drum is accelerated to the preset rotation speed after completion of the correction operation via the rotation of the main drum; and
   a further braking operation in which when the predetermined portion reaches the second braking-initiation position after completion of the further rotation operation, a preset first braking of the main drum is initiated.

5. The method of claim 4, wherein the further rotation operation includes:
   a first further rotation operation in which the auxiliary drum is accelerated to the preset rotation speed via the rotation of the main drum; and
   a second further rotation operation in which the auxiliary drum further rotates by a second target angle after completion of the first further rotation operation via the rotation of the main drum.

6. The method of claim 5, wherein the second target angle is defined as an angle by which the auxiliary drum rotates for a duration from a completion time of the first further rotation operation to a time when the predetermined portion reaches the second braking-initiation position.

7. The method of claim 6, wherein the apparatus further includes a first sensor unit configured to sense a rotation of the auxiliary drum,
   wherein the completion time of the first further rotation operation coincides with a time when the first sensor unit has achieved at least two times sensings such that the auxiliary drum rotates at least once.

8. The method of claim 4, wherein the further rotation operation is configured such that the auxiliary drum is accelerated to about 20 rpm via the rotation of the main drum.

9. The method of claim 2, wherein the preset rotation speed is set such that the main drum slips within a predetermined range.

10. The method of claim 9, wherein the preset rotation speed is set to a range of 0 rpm exclusive and 5 rpm inclusive.

11. The method of claim 2, wherein the rotation operation includes:
    a first rotation operation in which the auxiliary drum is accelerated to the preset rotation speed via the rotation of the main drum; and
    a second rotation operation in which the auxiliary drum rotates further by a first target angle after a completion of the first rotation operation via the rotation of the main drum.

12. The method of claim 11, wherein the first target angle is defined as an angle by which the auxiliary drum rotates for a duration from a completion time of the first rotation operation to a time based on the predetermined portion reaching the first braking-initiation position.

13. The method of claim 11, wherein the apparatus further includes a first sensor unit configured to sense a rotation of the auxiliary drum,
    wherein the completion time of the first rotation operation coincides with a time when the first sensor unit has performed at least two times sensings such that the auxiliary drum rotates at least once.

14. The method of claim 13, wherein the apparatus further includes a second sensor unit configured to sense a rotation angle of the auxiliary drum,
wherein the second rotation operation is configured such that the auxiliary drum rotates until the second sensor unit senses the first target angle.

15. The method of claim 14, wherein the drive mechanism includes:
a rotation shaft connected to the drum; and
a motor,
wherein the motor includes:
a stator through which the rotation shaft passes and fixed to a bottom face of the tub; and
a rotor fixed to the rotation shaft and rotating about the stator,
wherein the second sensor unit includes:
a plurality of second magnets arranged along and on an outer periphery of the rotor and spaced apart from each other at a predetermined angular spacing; and
a single second Hall sensor disposed on the tub to sense the plurality of second magnets.

16. The method of claim 11, wherein the auxiliary drum rotates at the preset rotation speed in the second rotation operation via the rotation of the main drum.

17. The method of claim 1, wherein the apparatus further includes:
a single water-supply configured to supply washing-water;
an outer water-supply guide disposed on the auxiliary drum to guide washing water discharged from the water-supply to the main drum; and
an inner water-supply guide spaced apart from the outer water-supply guide, wherein the inner water-supply guide is disposed on the auxiliary drum to guide the washing-water discharged from the water-supply to the auxiliary drum,
wherein the predetermined portion includes the outer water-supply guide or the inner water-supply guide,
wherein the target position includes:
a main target position at which the outer water-supply guide is positioned below the water-supply; or
an auxiliary target position at which the inner water-supply guide is positioned below the water-supply via rotation of the auxiliary drum.

18. The method of claim 17, wherein the method further comprises, after performing the positioning operation, a water-supply initiation operation in which the water-supply is opened to supply the washing-water.

19. The method of claim 18, wherein the water-supply initiation operation includes:
a main water-supply initiation operation in which washing water is supplied from the water supply to the tub at the main target position; and
an auxiliary water-supply initiation operation in which washing-water is supplied from the water-supply to the auxiliary drum in the auxiliary target position.

20. The method of claim 1, wherein the method further comprises an auxiliary-drum mounting detection operation for detecting whether the auxiliary drum is mounted in the main drum.

21. The method of claim 20, wherein, based on the auxiliary drum being determined to be mounted in the main drum in the auxiliary-drum mounting detection operation, the positioning operation is initiated.

22. The method of claim 1, wherein the apparatus further includes a first magnet disposed on the auxiliary drum and a first Hall sensor disposed on the tub to sense the first magnet.

* * * * *